US009958320B2

(12) United States Patent
Burchard et al.

(10) Patent No.: US 9,958,320 B2
(45) Date of Patent: May 1, 2018

(54) APPARATUS FOR SELECTIVELY TRANSMITTING THE SPECTRUM OF ELECTROMAGNETIC RADIATION WITHIN A PREDEFINED WAVELENGTH RANGE

(71) Applicant: Elmos Semiconductor AG, Dortmund (DE)

(72) Inventors: Bernd Burchard, Dortmund (DE); Frank Kleinschmidt, Dortmund (DE); Jesco Möller, Dortmund (DE)

(73) Assignee: Elmos Semiconductor AG, Dortmund (DE)

( * ) Notice: Subject to any disclaimer, the term of this patent is extended or adjusted under 35 U.S.C. 154(b) by 0 days. days.

(21) Appl. No.: 14/399,463

(22) PCT Filed: Oct. 31, 2012

(86) PCT No.: PCT/EP2012/071595
§ 371 (c)(1),
(2) Date: Nov. 6, 2014

(87) PCT Pub. No.: WO2013/167208
PCT Pub. Date: Nov. 14, 2013

(65) Prior Publication Data
US 2015/0138547 A1 May 21, 2015

(30) Foreign Application Priority Data

May 7, 2012 (EP) .................................... 12167001

(51) Int. Cl.
G01J 3/28 (2006.01)
G01J 3/02 (2006.01)
(Continued)

(52) U.S. Cl.
CPC ............ *G01J 3/0205* (2013.01); *G01J 3/0229* (2013.01); *G01J 3/0259* (2013.01); *G01J 3/0262* (2013.01);
(Continued)

(58) Field of Classification Search
CPC ..... G02B 5/204; G02B 5/201; H01L 27/1462; H01L 27/14621; H01L 27/14623;
(Continued)

(56) References Cited

U.S. PATENT DOCUMENTS 5,483,387 A * 1/1996 Bauhahn ................ G02B 5/204
348/341
5,731,899 A * 3/1998 Meyers ................ G02B 3/0056
359/621
(Continued)

FOREIGN PATENT DOCUMENTS

EP 1475963 A2 11/2004
EP 1517374 A2 3/2005
(Continued)

OTHER PUBLICATIONS

International Search Report for corresponding PCT Application No. PCT/EP2012/071595, dated Dec. 7, 2012 (2 pgs.).
(Continued)

Primary Examiner — Tri Ton
Assistant Examiner — Rufus Phillips
(74) Attorney, Agent, or Firm — Shumaker & Sieffert, P.A.

(57) ABSTRACT

The apparatus for selectively transmitting the spectrum of electromagnetic radiation within a predefined wavelength range is provided with a carrier (115), a pinhole diaphragm which is arranged above the carrier (115) and is made of a material that is substantially impermeable to the radiation of interest, wherein the pinhole diaphragm has at least one
(Continued)

Figure 1:
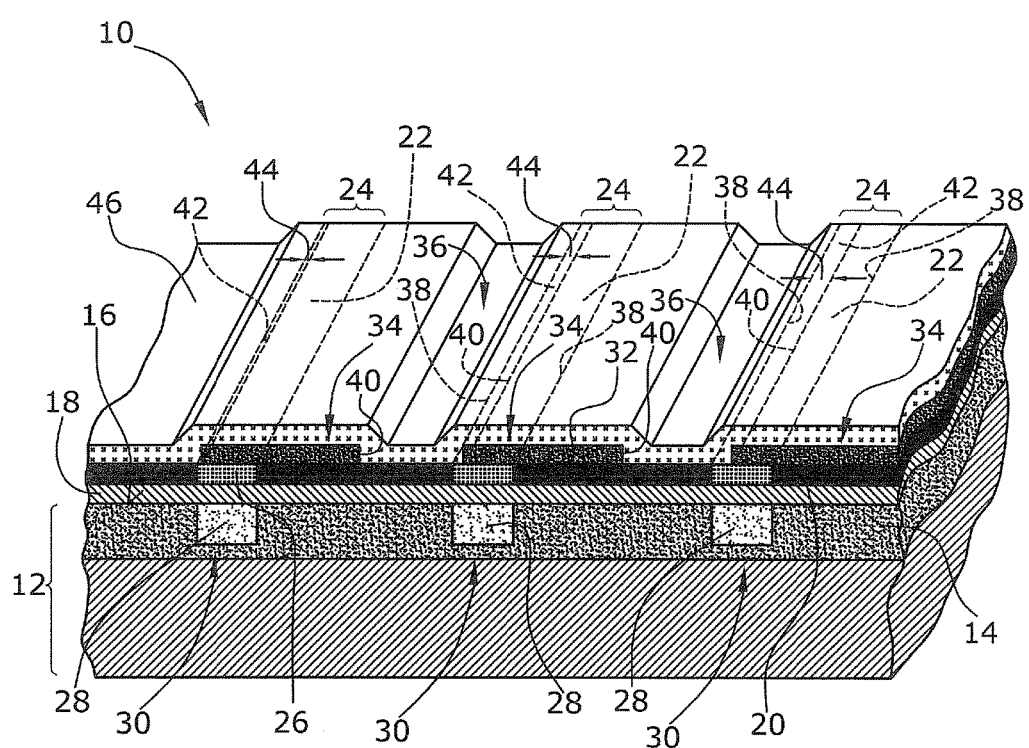

radiation passage opening with a size for allowing through radiation at a wavelength which is less than or equal to a predefinable upper limit wavelength, and an electrically insulating and optically transparent dielectric layer (103) which is formed on the carrier (115) inside the radiation passage opening and extends, in a manner adjoining the radiation passage opening, between the carrier (115) and at least one section below the pinhole diaphragm. The dielectric layer (103) has a thickness which is less than or equal to half a predefinable lower limit wavelength which is less than the upper limit wavelength.

8 Claims, 29 Drawing Sheets

(51) Int. Cl.
    *G02B 5/00*      (2006.01)
    *G02B 5/20*      (2006.01)
    *G01J 3/04*      (2006.01)

(52) U.S. Cl.
    CPC ................ *G01J 3/04* (2013.01); *G02B 5/008* (2013.01); *G02B 5/201* (2013.01); *G02B 5/204* (2013.01); *G02B 5/208* (2013.01)

(58) Field of Classification Search
    CPC .......... G01J 3/0229; G01J 3/0262; G01J 3/04; G01J 2003/045; G01J 2003/047; G01J 3/0259
    See application file for complete search history.

(56) References Cited

U.S. PATENT DOCUMENTS

| | | | | |
|---|---|---|---|---|
| 6,429,587 B1* | 8/2002 | Sugimachi | ............ | G02B 5/204 174/389 |
| 6,870,624 B2* | 3/2005 | Hobbs | .................... | G02B 5/204 356/416 |
| 7,002,742 B2* | 2/2006 | Imaizumi | ................. | G02B 1/11 359/484.03 |
| 7,031,566 B2* | 4/2006 | Kochergin | ............ | B82Y 20/00 385/27 |
| 7,629,569 B2* | 12/2009 | Tharp | .................... | G02B 5/204 250/225 |
| 7,704,648 B2* | 4/2010 | Su | .......................... | G02B 5/204 430/7 |
| 8,334,493 B2* | 12/2012 | Yokogawa | ............. | G02B 5/201 250/208.1 |
| 2006/0044429 A1 | 3/2006 | Toda et al. | | |
| 2008/0170143 A1 | 7/2008 | Yoshida | | |
| 2009/0296246 A1* | 12/2009 | Yamada | ................. | B82Y 20/00 359/885 |
| 2010/0176280 A1 | 7/2010 | Yokogawa | | |
| 2010/0195197 A1* | 8/2010 | Usami | ..................... | C03C 17/38 359/359 |
| 2010/0301224 A1* | 12/2010 | Morel | ............... | H01L 27/14661 250/370.09 |

FOREIGN PATENT DOCUMENTS

| | | | | |
|---|---|---|---|---|
| EP | 2251718 A1 | 11/2010 | | |
| EP | 2521179 A1 | 11/2012 | | |
| WO | WO 9400891 A1 * | 1/1994 | ............ | G02B 5/204 |
| WO | 2009106316 A2 | 9/2009 | | |
| WO | 2012007147 A1 | 1/2012 | | |
| WO | 2013167208 A1 | 11/2013 | | |

OTHER PUBLICATIONS

Written Opinion for corresponding PCT Application No. PCT/EP2012/071595, dated Apr. 23, 2014 (6 pgs.).

International Preliminary Report on Patentability for corresponding PCT Application No. PCT/EP2012/071595, dated Aug. 5, 2014 (20 pgs.).

Morse et al., "The Diffraction of Waves by Ribbons and by Slits," Physical Review, vol. 54, pp. 895-898, Dec. 1, 1938.

\* cited by examiner

APPARATUS FOR SELECTIVELY TRANSMITTING THE SPECTRUM OF ELECTROMAGNETIC RADIATION WITHIN A PREDEFINED WAVELENGTH RANGE

The invention relates to an apparatus for selectively transmitting the spectrum of electromagnetic radiation within a predefined wavelength range, and in particular to a micro-optical filter. The invention further relates to the use of a micro-optical filter in a device for detecting the spectrum of electromagnetic radiation within a predefined wavelength range (spectrometer) that can be manufactured using process steps for the manufacture of semiconductor components and can thus be manufactured with rather small dimensions as a micro-optoelectronic system (MOES).

Spectrometers are known in various designs. In a spectrometer, the electromagnetic radiation under examination impinges on a plurality of radiation-sensitive sensor elements which are sensitive to radiation in different frequency bands within the frequency range of interest, i.e. to radiation with different wavelengths within the wavelength range of interest. Thus, the intensity of the radiation can be detected by measurement over its entire wavelength range of interest.

Here, the wavelength-selective sensor elements can be realized, for example, by photodiodes having slit apertures or pinhole diaphragms of different widths. Examples for such solid state spectrometers can be found in EP-A-1 475 963 and EP-A-1 517 374. In the spectrometers of these two documents, the pinhole diaphragms are formed by a single aperture mask, respectively, wherein the mutual distances of the edges of the aperture mask windows defining the holes differ from aperture mask to aperture mask. It has been known for a long time that slit and pinhole diaphragms have a wavelength-selective effect (see, for example, in P. Morse, P. J. Rubenstein; The Diffraction of Waves by Ribbons and by Slits; Physical Review; Vol. 54; Dec. $1^{st}$ 1938; p. 895-898). The manufacture of such pinhole diaphragms for optical components requires a high-precision manufacturing process on an nm-scale regarding the manufacture and the reproducibility of the aperture mask.

In chemical, biochemical, medical and forensic analytics, spectrometry is an important factor. Therefore, the availability of a spectrometer that is simple to produce is an essential prerequisite for a broad-scale application of real-time spectrometry or of widespread spectrometry, for example, in medical technology, in agriculture or in industry in general. In this respect, the problem is to be able to economically manufacture a precise, energy-selective optical functional element. Today, almost all spectrometers have microelectronic circuits typically made using CMOS technology.

From US-A-2006/0044429, a device for detecting the spectrum of electromagnetic radiation is known, which operates according to the principle of interference (see paragraph 167 of this publication).

US-A-2010/0176280 describes an optical element having an optical filter formed by two filter elements, wherein at least one of the filter elements is a metal optical filter.

WO-A-2009/106316 describes a multispectral image sensor having concentric ring slits.

US-A-2008/0170143 shows an image pick-up element in which a pinhole diaphragm is provided that has different hole distances in different sections thereof.

Finally, EP-A-2 251 718 shows a metal optical filter that can be manufactured using photolithography.

The frequency or wavelength dependence of the sensitivity of the sensor elements can be realized by means of an optical filter designed as a pinhole diaphragm having a plurality of radiation passage openings whose sizes are selected to differ from each other. However, optical filters on a pinhole diaphragm base are also relevant in other applications than in spectrometers, wherein the design of the filter should be chosen such that the radiation of interest can pass the filter (and thus the at least one radiation passage opening) with as little hindrance as possible.

It is an object of the invention to provide an (e.g. solid state) apparatus for filtering electromagnetic radiation that allows the radiation of interest to pass substantially unhindered.

The object is achieved, according to the invention, with an apparatus for detecting of the spectrum of electromagnetic radiation within a predefined wavelength range, the apparatus being provided with
   a carrier (substrate),
   a pinhole diaphragm arranged above the carrier and made of a material substantially impermeable to the radiation of interest, the pinhole diaphragm having at least one radiation passage opening with a size for allowing the passage of radiation of a wavelength less than or equal to a predefinable upper limit wavelength, and
   an electrically insulating and optically transparent dielectric layer formed on the carrier inside the radiation passage opening and extending, in a manner adjoining the radiation passage opening, between the carrier and at least one section below the pinhole diaphragm,
   wherein the dielectric layer has a thickness which is less than or equal to half a predefinable lower limit wavelength which is less than the upper limit wavelength.

In its most general form, the apparatus of the present invention for filtration of electromagnetic radiation (or, generally, for modifying at least one electromagnetic wave), is provided with
   a substrate, and
   at least one pinhole diaphragm arranged above the substrate, which pinhole diaphragm has resonance damping characteristics and comprises in particular a material absorbing radiation in the predefined wavelength range and/or a scattering substructure, in particular at least one edge with a bevel, the pinhole diaphragm comprising at least one further structural element, in particular a window or a web.

The apparatus of the present invention for filtering electromagnetic radiation comprises an optically undisturbing carrier made of a material that, corresponding to the purpose, is sufficiently permeable to the electromagnetic radiation passing the filter, i.e. which has no significant absorbing, reflecting or otherwise disturbing effect. The carrier may be made, for example, of glass or a semi-conductive material such as p-doped silicon. If the filter is manufactured using lithography, thin layers are used that can have an optical effect, namely as waveguides. Thin layers can act as waveguides only for extremely high-frequent, i.e. extremely short-wave radiation. Such wave guiding characteristics may also be parasitic and thus undesired. However, when using lithographic manufacturing methods, such thin, most often dielectric, optically transparent layers cannot be dispensed with. Therefore, it is provided according to the invention that the pinhole diaphragm arranged above the carrier is arranged at least in part on an electrically insulating and optically transparent dielectric layer, whose thickness is in the range from less than or equal to one half to less than or equal to a quarter of the predefined lower limit wavelength (of the optical filter), whereas the pinhole diaphragm comprises at least one radiation passage opening, whose size is chosen such that radiation passes the opening, which has a wavelength less than or equal to a predefined upper limit wavelength.

Due to the structure of the optically transparent dielectric layer, as provided by the present invention, it becomes possible that exclusively high-frequent, i.e. short-wave radiation propagates in the optical filter differently from what was originally provided, with this high-frequent radiation coupling into the dielectric layer after having passed the radiation passage opening, whereby it have a disturbing effect. In an advantageous development of the invention, this can be suppressed further by a high-pass or a low-pass filter upstream of the optical filter, which high- or low-pass filter filters out the electromagnetic radiation otherwise coupling into the dielectric layer and thereby ensures that this electromagnetic radiation does not even get into the radiation passage opening.

In other words, the invention provides an optical filter in which the size of the radiation passage opening defines an upper limit wavelength up to which radiation passes the radiation passage opening. With reference to the frequency range, this means that the filter has a lower limit frequency so that radiation with a frequency equal to or higher than the lower limit frequency is allowed to pass. Above an upper limit frequency, radiation is (inevitably) coupled into the dielectric layer. Thus, radiation with a frequency above this limit frequency does not permeate through the dielectric layer insofar as this radiation does not pass through the dielectric layer (with respect to the thickness direction of the dielectric layer). In a way, the present optical filter thus is a band pass filter.

In a further advantageous embodiment of the invention it can be provided that the dielectric layer extends between the carrier and the entire pinhole diaphragm. As an alternative, it is also possible, however, that the pinhole diaphragm is formed outside the dielectric layer on the carrier.

For the reduction of interferences, resonances, attenuations or similar disturbances of the radiation passing the filter, it is further advantageous for the pinhole diaphragm to have a defined electric potential. In this regard, it is useful if the pinhole diaphragm is electrically insulated from the carrier. This is due to the fact that preferably radiation-sensitive sensor elements can be integrated in the carrier, which, if the material used for the carrier is a semi-conductive material, can be realized in form of diodes, for example. In order to decouple the pinhole diaphragm from the different voltage potentials present in different regions of the carrier, electric insulation is thus suitable.

Radiation impinging on the edge of the radiation passage opening or on the edges of the radiation passage opening can also cause disturbances (interferences, reflections, resonances etc.). If such undirected or modified radiation passes the filter, this can also result in adverse effects. Insofar, it is suitable to direct radiation impinging on the edge away from the filter, if possible. In an advantageous embodiment of the invention this is achieved by providing the edge (or at least a section of the edge) of the at least one or each radiation passage opening with a bevel.

In a further advantageous embodiment of the invention it may be provided that the pinhole diaphragm has two aperture masks laterally offset with respect to each other and arranged in different planes above the carrier, and that the two aperture masks have mutually overlapping windows that define the at least one radiation passage opening or respectively define one radiation passage opening.

Further, if the first aperture mask is formed on the dielectric layer, it can be useful to form an intermediate dielectric layer on the first aperture mask and within the window or windows thereof, the intermediate dielectric layer being made of an electrically insulating and optically permeable dielectric material, and to form the second aperture mask on the intermediate dielectric layer, wherein the total thickness of the double layer formed by the dielectric layer and the intermediate dielectric layer is less than or equal to one half to a quarter of the lower limit wavelength between the second aperture mask and the carrier.

In another advantageous embodiment of the invention it can be provided that, between the carrier and the first aperture mask, the dielectric layer is provided only outside the window or windows thereof.

Finally, it is also possible that, in the window or windows of the first aperture mask, the thickness of the dielectric layer is reduced with respect to the rest of its extension.

In another advantageous embodiment of the invention it can be provided that for the absorption and/or reflection of radiation of interest (i.e. radiation having a wavelength that can pass the radiation passage opening(s)) that does not impinge on the radiation passage opening or radiation passage openings, the material and/or the material thickness of the pinhole diaphragm or of both aperture masks is/are selected such in particular (i) a degree of absorption of at least 60% or at least 80% and (ii) a degree of reflection of less than 40%, preferably less than 20% is achieved.

Further, it is possible that the pinhole diaphragm has a plurality of radiation passage openings that differ in size and thus define upper limit wavelengths of different lengths, wherein one or a plurality of radiation passage openings is provided for each different size, and that the thickness of the layer or the layers between the carrier and the pinhole diaphragm or parts thereof, or between the carrier and the two aperture masks or the second aperture mask is, respectively, less than or equal to one half to a quarter of the smallest upper limit wavelength defined by the radiation passage opening.

The (micro-)optical filter of the present invention can be used to an advantage in a spectrometer, namely for wavelength selection of electromagnetic radiation to be detected by means of the spectrometer, wherein each radiation passage opening is associated with a radiation-sensitive sensor element receiving the radiation passing through this very radiation passage opening, the sensor element serving to detect the intensity of this radiation. In this regard, the spectrometer can be provided with:

a substrate, an aperture mask arranged above the substrate and made of a material impermeable to radiation within the predefined wavelength range, the first aperture mask having a plurality of first windows, a plurality of sensor elements arranged in the substrate and respectively sensitive to radiation at a different wavelength within the predefined wavelength range, and a second aperture mask arranged above the first aperture mask and comprising second windows, the second aperture mask being made of a material impermeable to radiation within the predefined wavelength range, wherein the second windows of the second aperture mask are arranged to overlap with the windows of the first aperture mask, and opposite edges of the respective two overlapping windows of the two aperture masks define the size of a radiation passage opening, which is associated with a respective sensor element, for the passage of radiation within the predefined wavelength range to the sensor element arranged below the radiation passage opening, wherein respective adjacent first windows are spaced at a first distance and respective second windows are spaced at a second distance that is different from the first distance (optical nonius) and wherein, for the detection of the intensity of electromagnetic radiation at each of the plurality of wavelengths of interest within the predefined wavelength range, at least one of the radiation passage openings is provided which has a size associated with the respective wavelength of interest.

The filter of the present invention is applicable with advantage in a solid-state spectrometer having a substrate, in particular a semiconductor substrate, as the filter carrier on which two aperture masks are arranged one above the other or the pinhole diaphragm is arranged. Each of the two aperture masks comprises a material that is impermeable to electromagnetic radiation within the wavelength range of interest. Further, each of the two aperture masks is provided with a plurality of first or second windows. The size of these windows and the shape of the edges are suitably chosen such that parasitic resonances, in particular in the form of standing waves, are minimized. In this context, a resonance means that an electromagnetic wave is reflected towards itself several times and no or only very little phase shift occurs, so that a constructive interference is obtained as, for example, in a Fabry-Perot interferometer. Preferably, the aperture mask material or a coating of the aperture masks is impermeable to and/or not reflective and/or not refractive for the radiation within the wavelength range of interest. This means that resonance paths that include the aperture mask material are maximally attenuated, preferably by maximizing light absorption or scattering into a harmless direction. Within the substrate, a plurality of sensor elements is provided that is sensitive to radiation in the wavelength range of interest.

Figure 15:
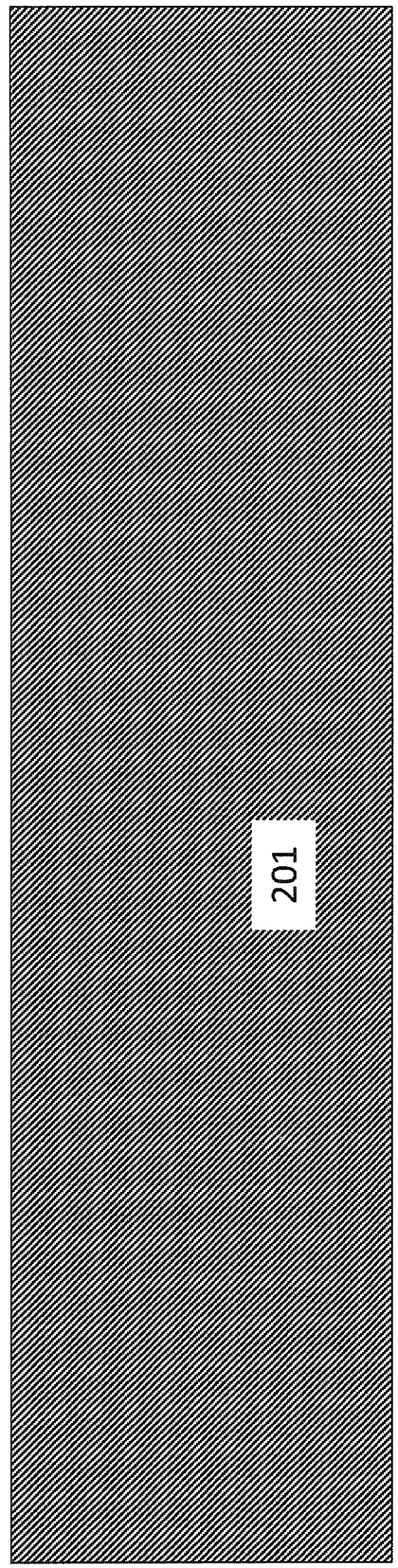
Figure 16:
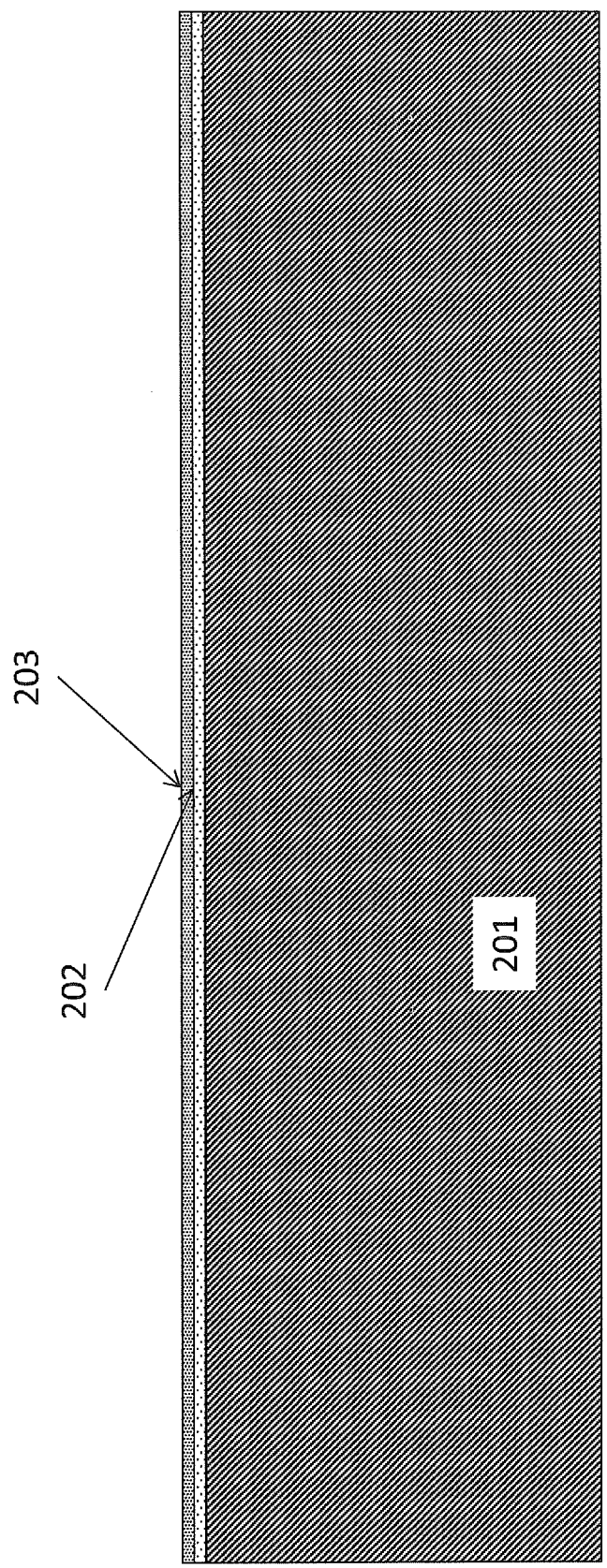

The two aperture masks are arranged relative to one another such that their windows more or less overlap. Here, the hole spacing of both aperture masks is slightly different, so that the degree of overlap of adjacent windows of the two aperture masks varies. Thereby, holes or radiation passage openings of different sizes are formed by two overlapping windows of the two aperture masks, respectively. The windows have openings which, due to the finite thickness of the aperture mask material, are arranged above the surface of the substrate and situate in the upper side of the aperture masks. In order to maximize the attenuation of the resonance paths formed in the structure by the edges having different reflective surfaces, the opposite edges of the windows of the two aperture masks that form the radiation passage openings are beveled in opposite directions, which results in an oblique further propagation of the light after passage through the radiation passage opening and thereby prevents resonance between the aperture masks and the substrate surface by scattering light out from the structure or minimizes resonance by reducing the resonator quality. Each of these holes or radiation passage openings is associated with a sensor element, typically in particular exactly one sensor element, so that eventually wavelength-selective sensor elements are obtained. Accordingly, the two aperture masks act as a filter for wavelength-dependent attenuation and thus act different from prior art, where, as in US-A-2006/0044429, other physical dispersion and interference effects are used. US-A-2006/0044429 explicitly uses wavelength-dependent interferences and resonances for the selection of different colors (cf. FIGS. 15, 16, 17 in US-A-2006/0044429). Therefore, each slit (e.g. FIG. 41, element 7 & 7b in US-A-2006/0044429) comprises a plurality of detectors. In this concrete instance, the slits comprise a blue color detector (FIG. 41, element 12B in US-A-2006/0044429), two green color detectors to the left and the right of the slit structure (FIG. 41, element 12G in US-A-2006/0044429) and two red color detectors to the left and the right of the slit structure (FIG. 41, element 12R in US-A-2006/0044429), which are shared with the next structure for space saving reasons. Due to the small optical path length, the resolution of this prior art structure is naturally limited and possibly suited for only a few colors, i.e. in the concrete instance, the colors red, green and blue. Further, there would not be enough space for the detectors, if more colors were intended. Thus, the structure of the device disclosed in US-A-2006/0044429 is not suited to achieve a higher resolution and to thereby fulfill the purpose of the present invention.

Advantageously, the holes or the radiation passage openings are not formed by the edges of the windows of a single aperture mask, but by the opposing edges of the overlapping windows of two aperture masks. Thereby, the size of the individual holes or radiation passage openings is defined by the positioning of the two aperture masks. The positional accuracy with which two aperture masks can be manufactured e.g. from polysilicon sheets or metalized sheets in semiconductor component manufacture, using photolithography steps, is substantially higher than the accuracy with which the distance between the edges defining a window in an aperture mask can be manufactured. Independent of the manufacturing accuracy and the positional accuracy, if a sufficiently large number of radiation passage openings, formed by overlapping windows of two aperture masks, with the associated sensor elements, there will always be a number of sensor elements within the substrate, whose wavelength selectivity is within the wavelength range of interest. After the spectrometer or its filter has been manufactured, all that is required is calibration in order to identify those adjacent sensor element among the plurality of manufactured wavelength-selective sensor elements (sensor element with radiation passage opening), which have a wavelength selectivity within the wavelength range of interest.

Thus, the invention also provides the use of the optical filter in a sold-state spectrometer, in which the special pinhole diaphragm structure is used as an optical filter. For the invention, the decisive idea is that it is possible to manufacture particularly small diaphragms with high precision by means of two lithography planes (the two aperture masks are located in different, preferably directly adjacent planes). The slit width or the dimensions of the radiation passage openings must not exceed $\lambda/4$, where $\lambda$ means the respective wavelength. In the UV range, slit widths of a few nm are thus obtained. These cannot be manufactured with simple CMOS technology manufacturing steps in a manner differing from the invention. Thus, the invention provides a structure for a spectrometer that can be manufactured in an extremely economical manner, namely by using simple CMOS technologies. Thus, the spectrometer and its optical filter can be mass produced at low cost.

The sensor elements can be realized in different ways. For example, it is conceivable to design the sensor elements as photodiodes. However, thermopile elements are also realizable within the framework of a solid-state spectrometer. Generally, it is useful if the radiation-sensitive sensor elements each comprise two different, electrically conductive materials in contact with each other and generating a variable electric parameter (such as current, voltage, resistance, capacity, inductivity, power) when they receive electromagnetic radiation within the predefined wavelength range, wherein the magnitude of the voltage generated depends on the intensity of the radiation.

The spectrometer can be of a one-dimensional design, so to speak, due to the fact that the radiation passage openings, which are formed by the overlapping windows of the aperture masks and which differ in size, are arranged side by side in one line or row. In this regard it is suitable, if the radiation passage openings are designed as slits of different widths. In such an embodiment of the invention, a polarization filter should be arranged above the aperture masks (and possibly above a passivation layer permeable to radiation). This polarization filter serves to shield electromagnetic waves whose E-field vectors extend transversely to the slit width, and to let through radiation having electromagnetic waves whose E-field vectors extend in the direction of the slit width extension.

According to an advantageous embodiment of the invention, it is provided in the above described variant that the first and second windows of the two aperture masks each extend over surfaces spanned along two span axes arranged at right angles to each other, that the dimensions of the first and second windows are respectively delimited in at least one common first axis of the two span axes by a first and a second limiting edge of the respective window, wherein, seen along a common first axis, each radiation passage opening is delimited by a first limiting edge of a first window of the first aperture mask and a second limiting edge of a second window of the second aperture mask overlapping the first window, and that the first distance of the first limiting edges of respective adjacent first windows of the first aperture mask is different from the second distance of the second limiting edges of respective adjacent second windows of the second aperture mask, wherein a polarization filter is arranged above the arrangement of aperture masks to shield off radiation with electromagnetic waves whose E-field vector is rectangular to the first span axis and to let through radiation having electromagnetic waves whose E-field vector is parallel to the first span axis.

It is possible to omit a polarization filter of the above type, if care is taken that the dimensions of the radiation passage openings are chosen such along two mutually rectangular span axes that they have a wavelength-selective effect. In this regard, it is thus provided that, also along the second common axis of the two span axes, the dimensions of the first and second windows are each delimited by a third and fourth limiting edge of the respective window, wherein, seen along the second common span axis, each radiation passage opening is delimited by a third limiting edge of the first window of the first aperture mask and a fourth limiting edge of a second window of the second aperture mask overlapping the first window.

As already mentioned above, the aperture masks can be made from a light-impermeable material by means of photolithographic processes, as they find application in particular in a CMOS, a BICMOS or a bipolar component manufacturing process. All these processes have in common that the distance between the same limiting edges of respective adjacent windows of each of the two aperture masks has a constant first tolerance (of 2 nm, for example), and the positioning of the two aperture masks relative to each other has a second tolerance (of 200 nm, for example) and the size of the windows has a third tolerance (typically also about 200 nm), wherein, with very small window sizes, the latter prevents manufacturing the same in one plane. Therefore, mathematically, the first tolerance is smaller by at least one order, preferably by at least two orders than the second and third tolerances. The reason therefore is that in photolithographic processes, the first tolerance reflects the precision of the masks used, whereas the second tolerance reflects the second tolerance of the precision with which masks can be positioned relative to each other or relative to a given substrate, and the third tolerance reflects the precision of the typically used etching processes for producing the pinhole diaphragms.

As already mentioned farther above, the sensor elements can be photodiodes, for example, which are integrated in the substrate. Suitably, the first aperture mask formed on the substrate is used to manufacture self-adjusted photodiodes in the substrate. In this regard, it is provided that an area is formed in the substrate from the top thereof, the area being provided with charge carriers of a first conductivity type, with partial areas with second charge carriers of a second conductivity type opposite the first conductivity type being formed in the first area, the partial areas being aligned with the first windows of the first aperture mask and being exposed within the windows and forming, together with the respective adjacent portions of the area, a photodiode from the first charge carriers.

Examples for fields of application for the spectrometer having the filter according to the present invention are:
monitoring liquids (e.g. monitoring the quality of fuels)
gas detectors
biosensors (a coating above the passivation reacts with a substance of the liquid under test, which is to be measured. This reaction changes the refractivity and thus the characteristic spectral frequency at the grid inlets)
DNA detectors (the DNA is moved in a medium by means of electrophoresis and is excited to a characteristic fluorescence by means of UV radiation)
sensors and devices for assessing the health condition of a patient, for example on the basis of a skin or tissue spectrum or the spectrum of body fluids such as blood and urine
particle counters (the spectrum of the scattered light depends on the particle size)
IR and NIR spectrometers
laser spectrometers
microwave spectrometers
multi-color barcodes
monitoring devices for operating materials in solid, gaseous or liquid form, such as oil condition sensors, UREA condition sensors, in particular also for motor vehicles condition detectors (for example, road condition detectors, icing detectors on planes etc.)
monitoring devices for operating conditions (e.g. temperature control, plasma spectra control, corrosion detection, phase transition detection, changes in a surface reflection spectrum due to physical and/or chemical influences—in particular discolorations)
micro-optical demodulation for frequency multiplexed optical signals
frequency-selective methods for optoelectronic applications such as light barriers etc. for improving the signal-to-noise ratio
detection of microbe-infested food and forage determination of relevant parameters in food such as the degree of ripeness or the sugar or alcohol content
determination of the humidity level in materials (e.g. forage)
markets: agriculture, chemistry, Glass industry, food When using the optical filter of the present invention in the context of an apparatus for detecting the spectrum of electromagnetic radiation within a predefined wavelength range, it can be provided with an advantage that at least two adjacent windows of the second aperture mask are arranged to overlap with a respective window of the first aperture mask.

It can advantageously apply to the aperture mask of the filter according to the invention that it applies to at least a subset of the windows that each of these windows of the second aperture mask is arranged to overlap with a respective window of the first aperture mask.

If need be, it is possible that the material of the first aperture mask and/or the second aperture mask includes a metal or polycrystalline silicon or in particular silicided polycrystalline silicon.

It can apply to the spectrometer that the radiation-sensitive sensor elements each comprise two different, electrically conductive materials in contact with each other and generating a variable electric parameter (such as current, voltage, resistance, capacity, inductivity, power) when they receive electromagnetic radiation within the predefined wavelength range, wherein the value of the parameter change depends on the intensity of the radiation.

As far as the pinhole diaphragm of the filter according to the invention is concerned, it is possible that the first and second windows of the two aperture masks each extend over surfaces spanned along two span axes arranged at right angles to each other, that the dimensions of the first and second windows are respectively delimited in at least one common first axis of the two span axes by a first and a second limiting edge of the respective window, wherein, seen along a common first axis, each radiation passage opening is delimited by a first limiting edge of a first window of the first aperture mask and a second limiting edge of a second window of the second aperture mask overlapping the first window, and that the first distance of the first limiting edges of respective adjacent first windows of the first aperture mask is different from the second distance of the second limiting edges of respective adjacent second windows of the second aperture mask.

Further, it is suitable if the dimensions of the first and second windows are each delimited by a third and fourth limiting edge of the respective window also along the second common axis of the two span axes, wherein, seen along the second common span axis, each radiation passage opening is delimited by a third limiting edge of the first window of the first aperture mask and a fourth limiting edge of a second window of the second aperture mask overlapping the first window.

The sensor elements can be designed, for example, as photodiodes, in particular pn diodes, or as IR diodes or as thermopile elements.

As already indicated above, it is possible that the aperture masks of the optical filter are formed by means of a photolithographic process of a semiconductor manufacturing process such as a CMOS, a BICMOS or a bipolar component manufacturing process, for instance.

In a further advantageous embodiment of the invention it is provided that the distance between the same edges of the windows of the first aperture mask and the distance between the same edges of the windows of the second aperture mask have a constant first tolerance, and the positioning of the two aperture masks relative to each other has a second tolerance, and the size of the windows of each of the two aperture masks has a third tolerance and that, mathematically, the first tolerance is smaller by at least one order, preferably by at least two orders than the second and third tolerances, the second tolerance being, in particular, substantially equal to the third tolerance.

For the purpose of realizing the sensor elements as structures integrated in the carrier, it is useful if an area is formed in the substrate from the top thereof, the area being provided with charge carriers of a first conductivity type, with partial areas with second charge carriers of a second conductivity type opposite the first conductivity type being formed in the first area, the partial areas being aligned with the first windows of the first aperture mask and being exposed within the windows and forming, together with the respective adjacent portions of the area, a sensor element, in particular a photodiode, from the first charge carriers.

It can further be advantageous for the optical filter of the present invention, if the two aperture masks are made of a material or are coated with a material that is not reflective and/or not refractive and/or impermeable to the radiation of interest.

Finally, in a further variant, the invention can also be conceived as an apparatus for selectively transmitting the spectrum of electromagnetic radiation within a predefined wavelength range. Here, I a preferred embodiment of the invention, the apparatus can be provided with a substrate,
a first diaphragm arranged above the substrate and made of a material impermeable to radiation within the predefined wavelength range,
a second diaphragm arranged above the first diaphragm and made of a material impermeable to radiation within the predefined wavelength range,
wherein the diaphragms are arranged such that opposite edges define the size of a radiation passage opening for the passage of radiation of a wavelength within the predefined wavelength range, and the distance between the two edges is so small that they form a high-pass or a band-pass for electromagnetic radiation, and
that the two diaphragms are separated by a layer transparent in the wavelength range of interest, the thickness of the layer being less than $\lambda/2$ and/or less than $\lambda/4$, where $\lambda$ is the smallest wavelength of interest.

Figure 2:
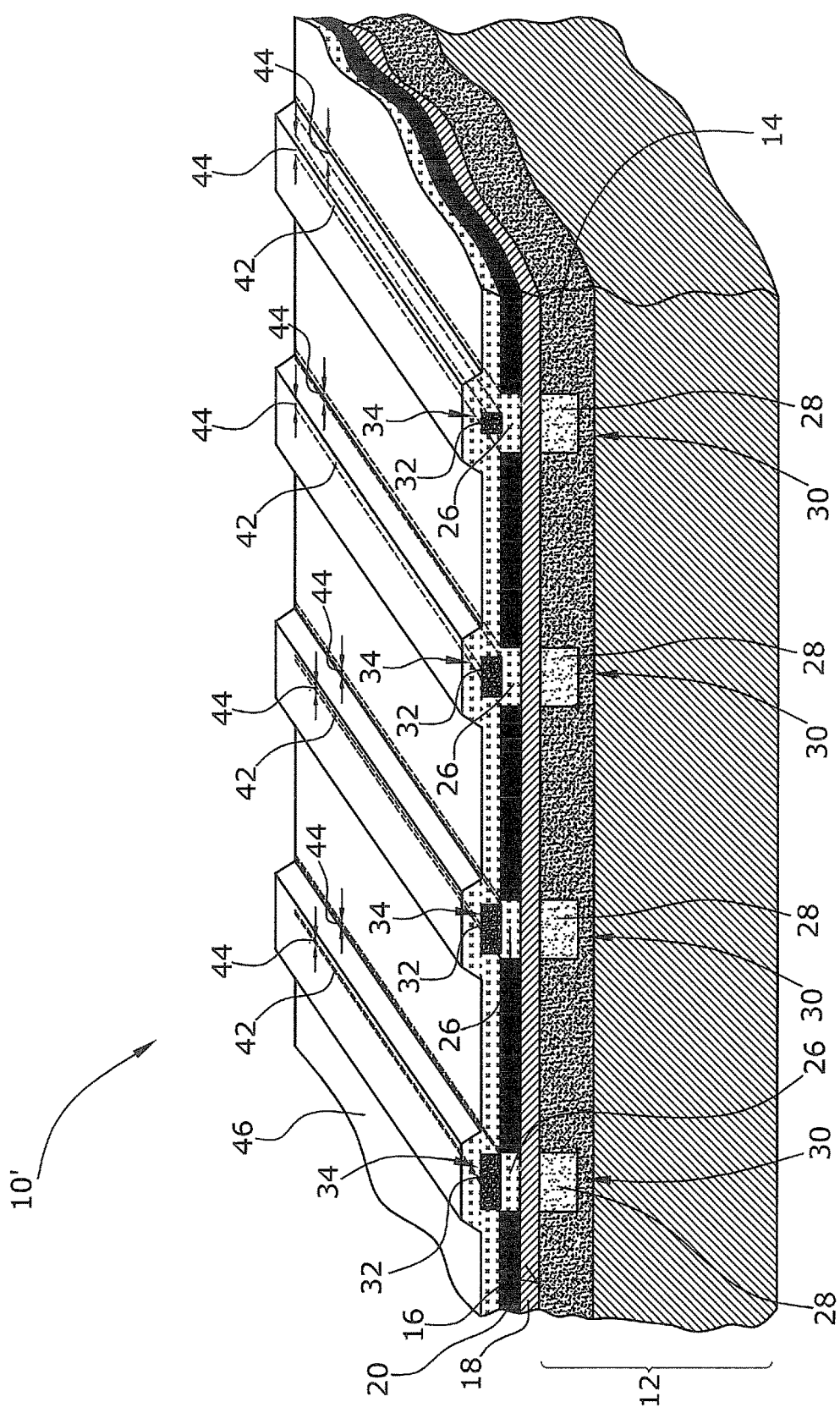
Figure 3:
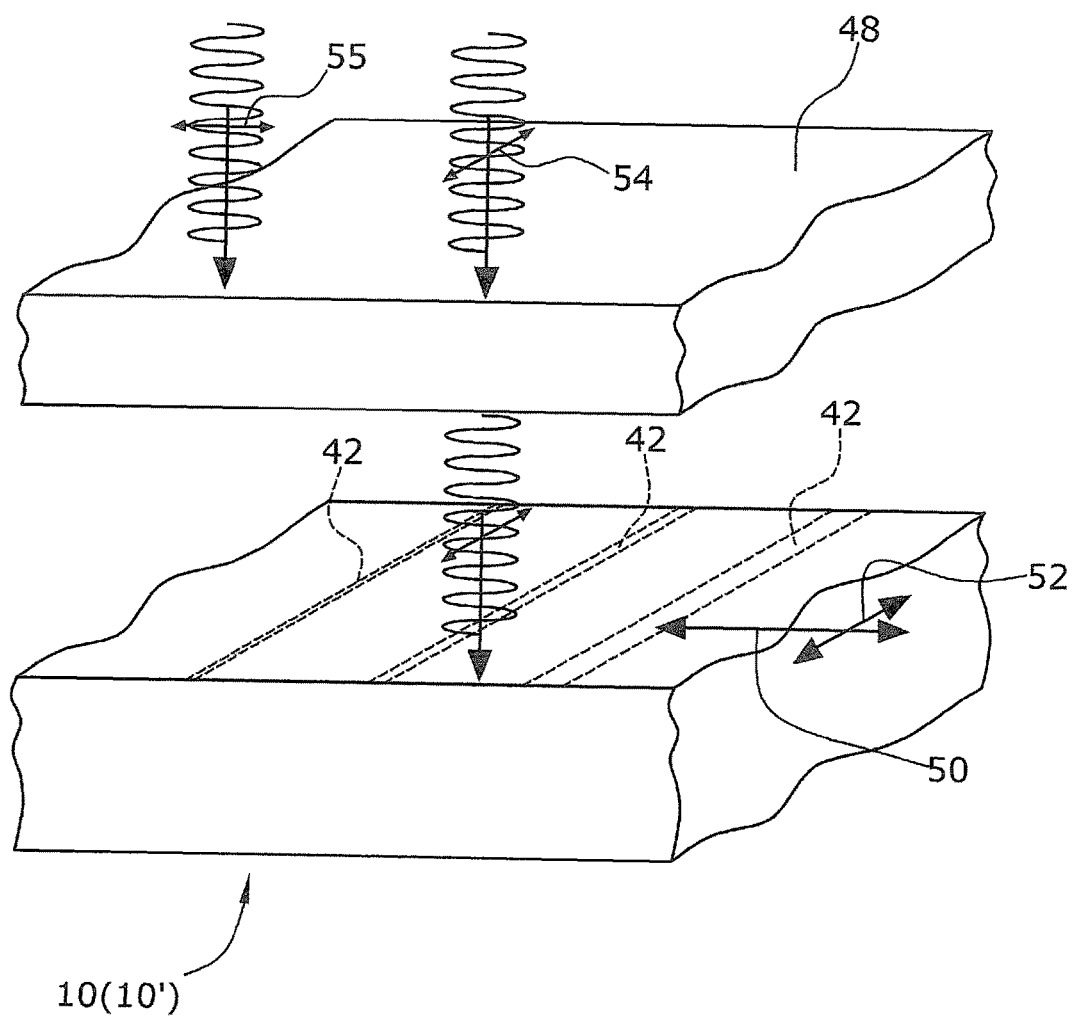
Figure 4:
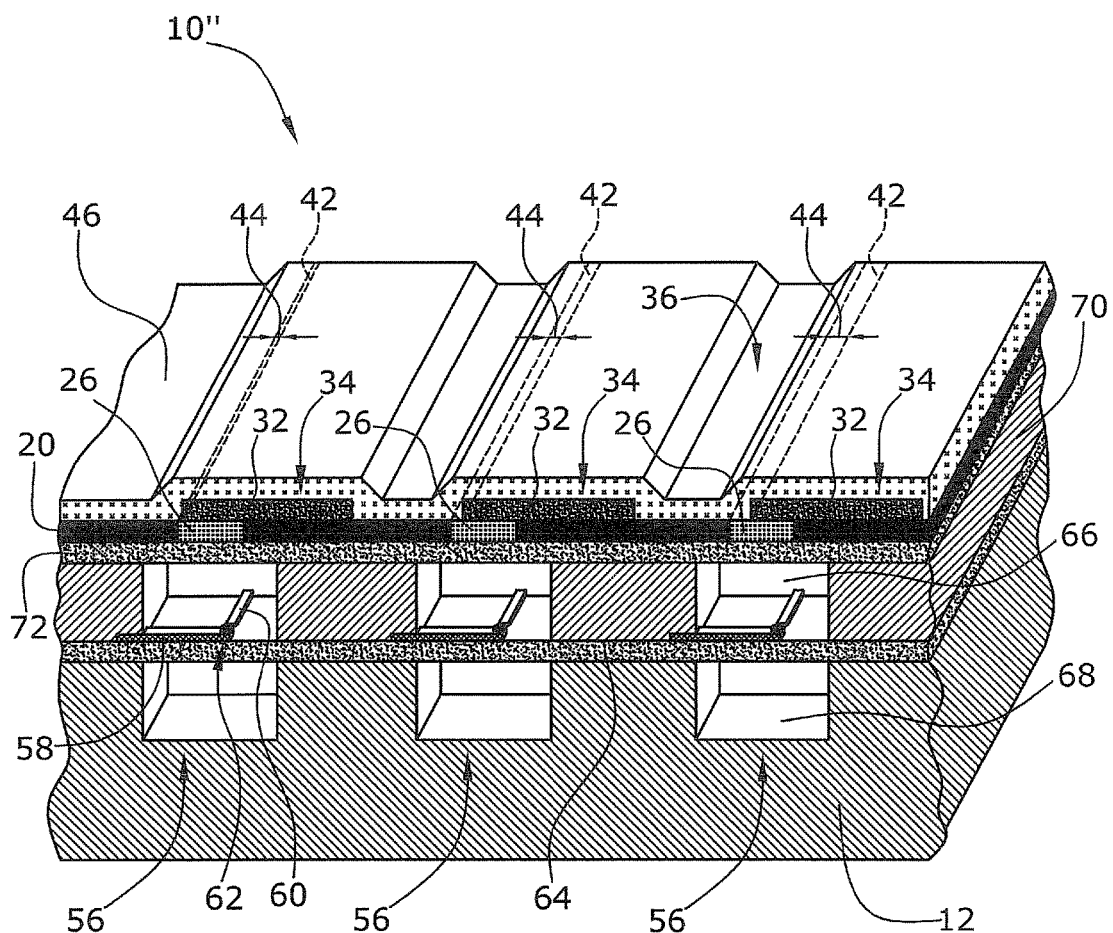
Figure 5:
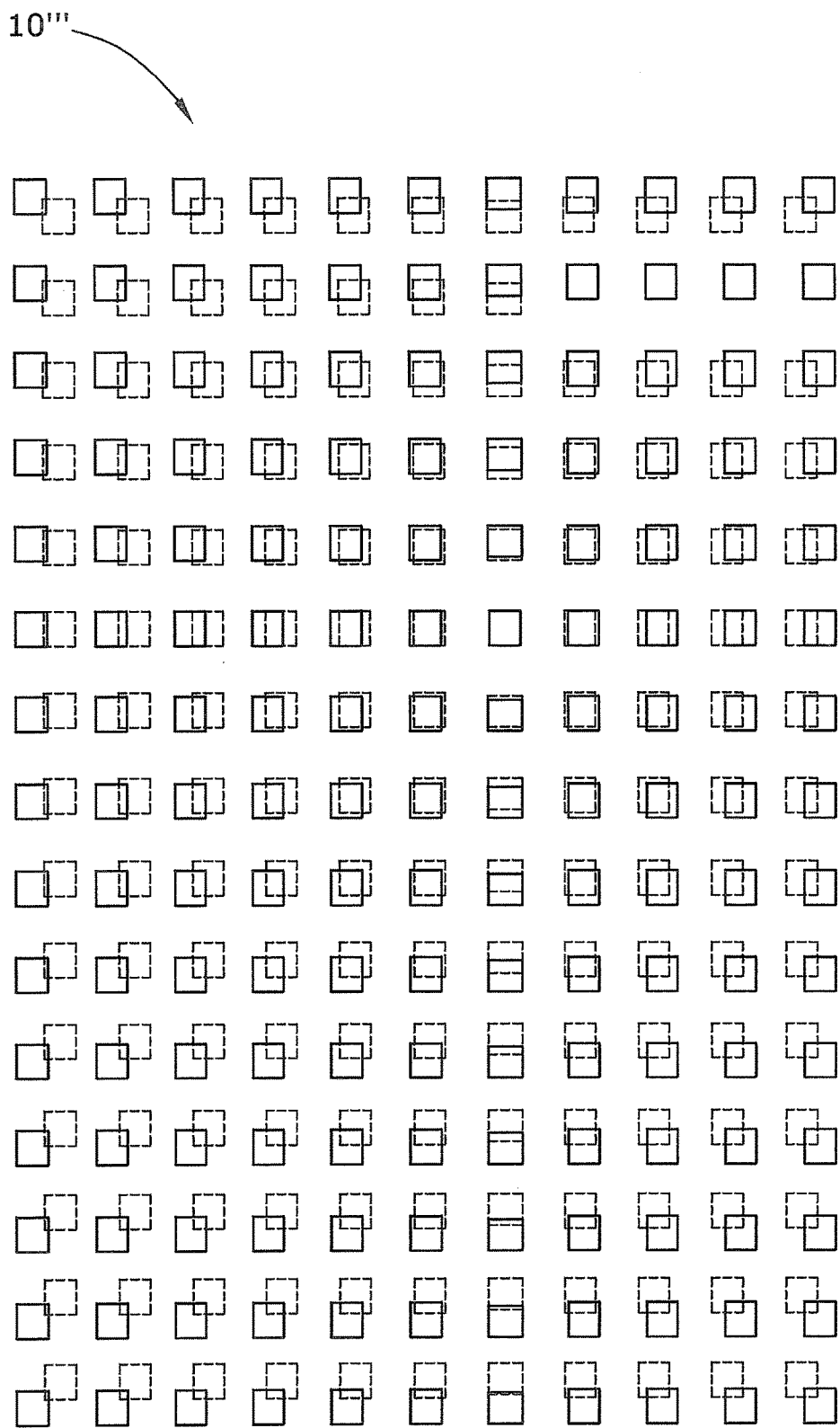
Figure 6:
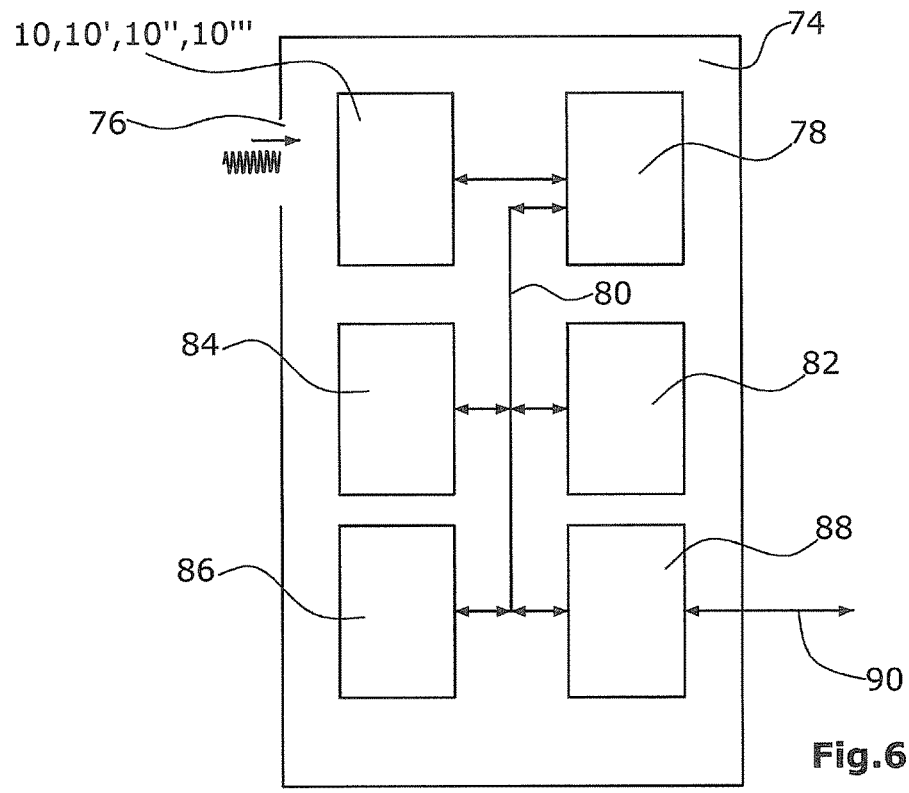
Figure 7:
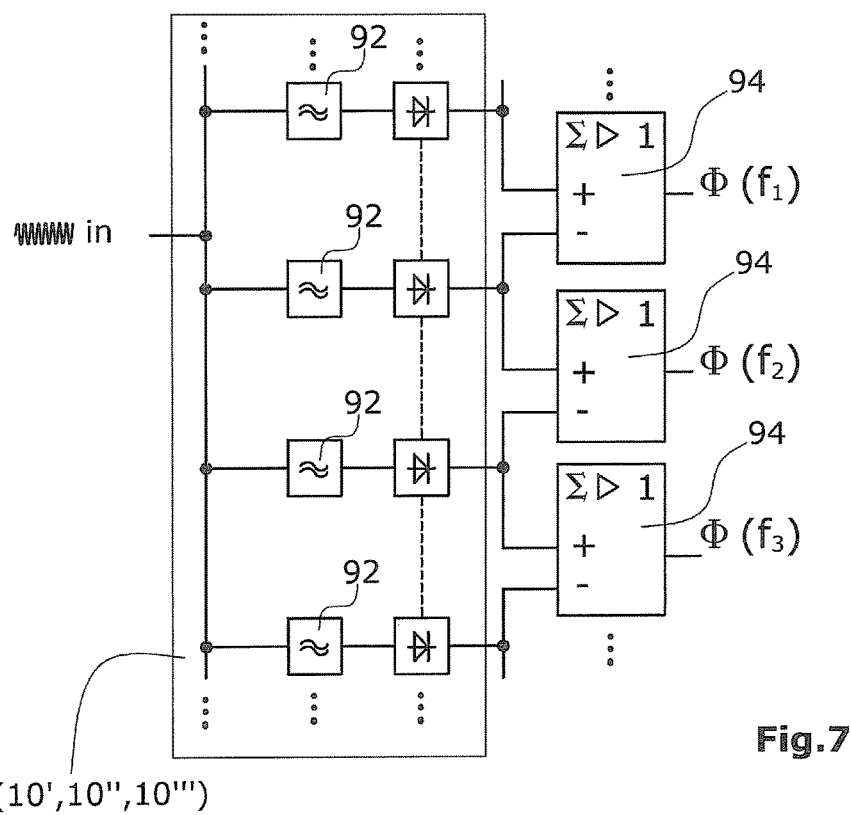
Figure 8:
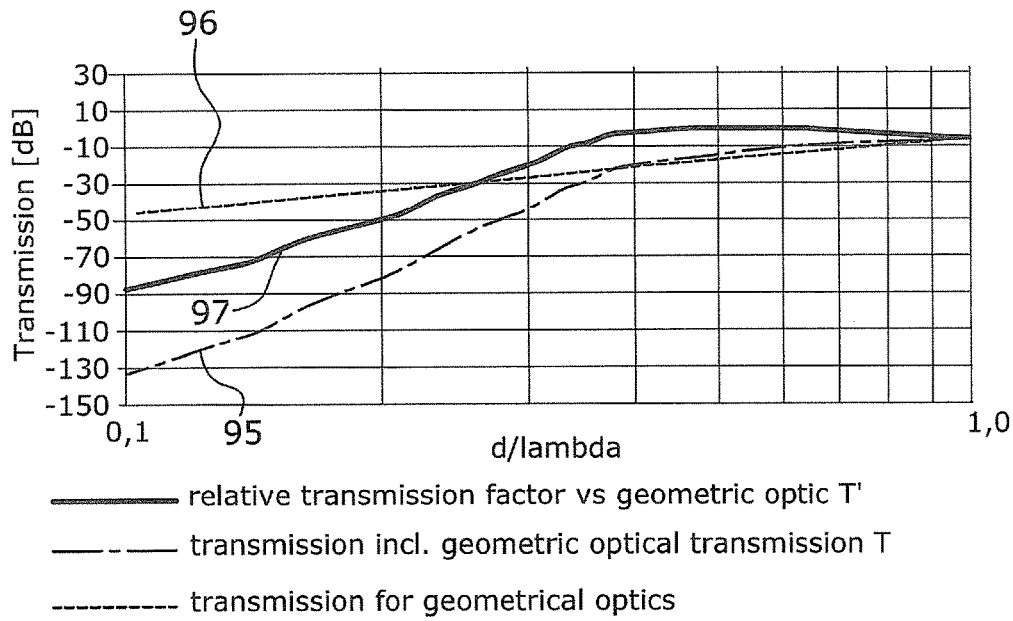
Figure 9:
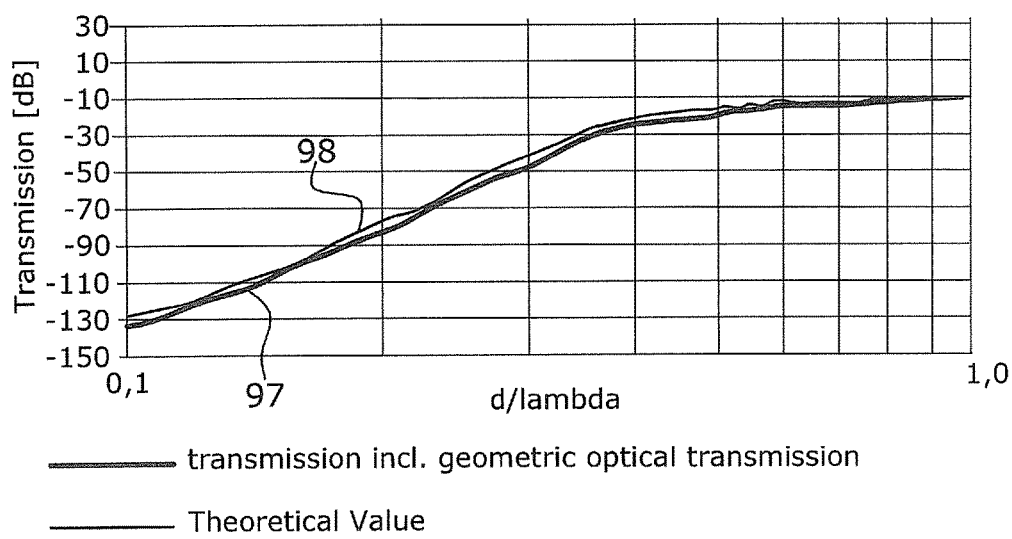
Figure 10:
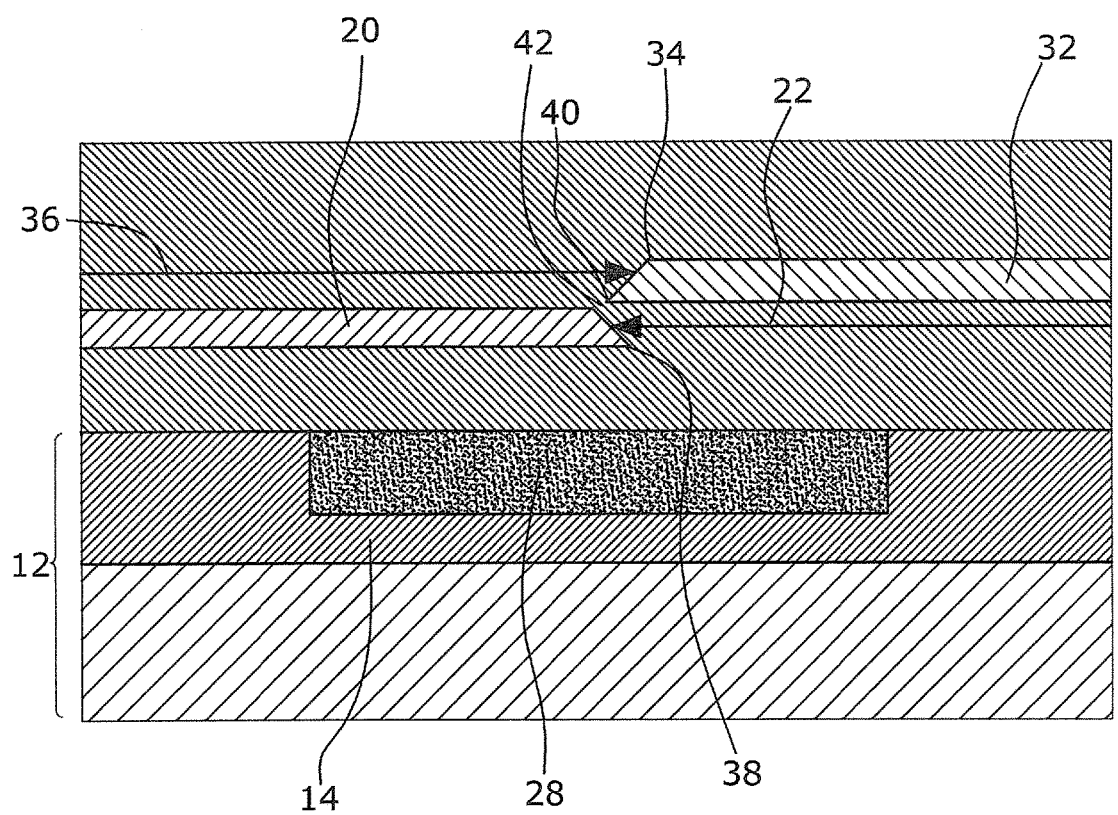
Figure 11:
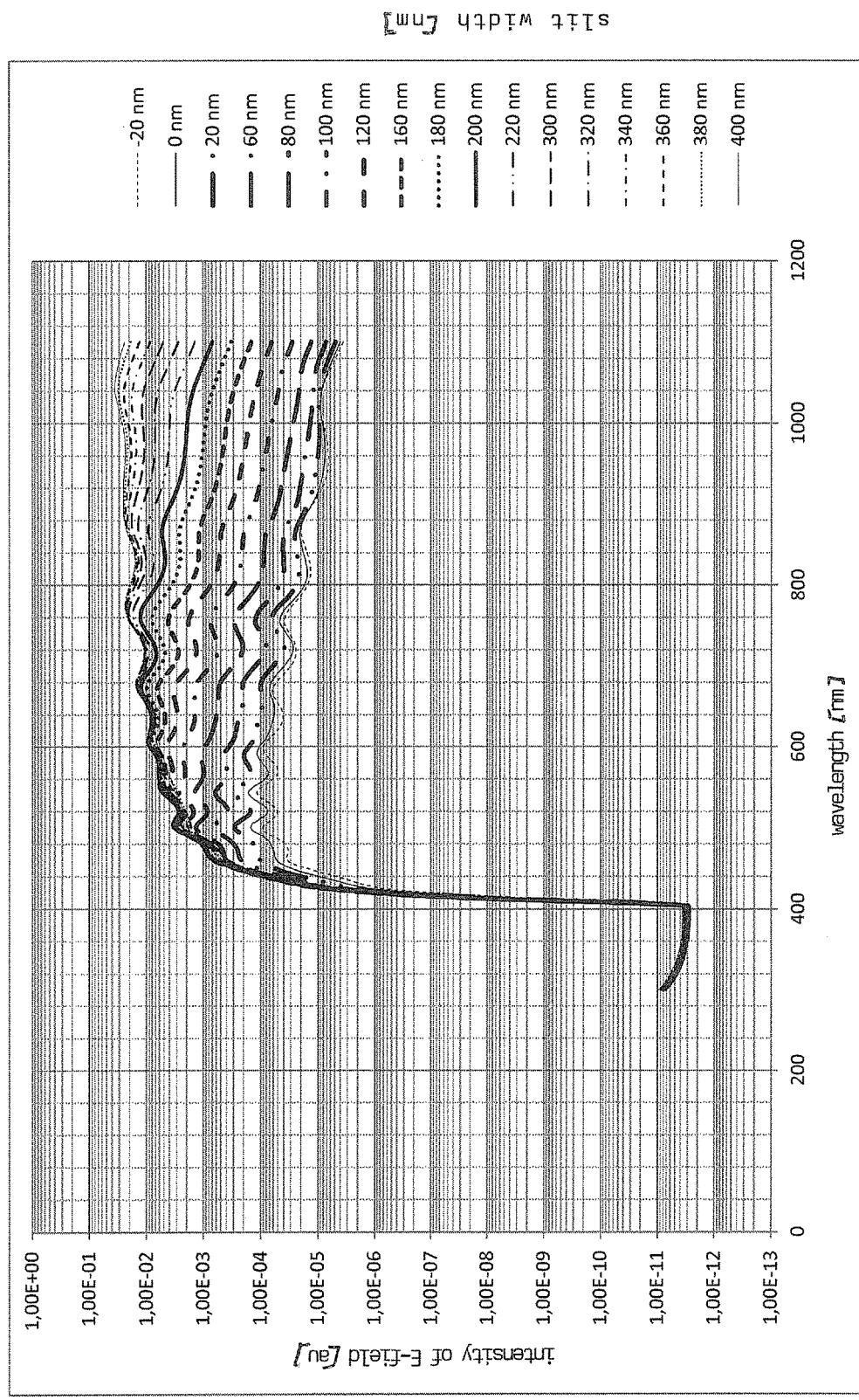
Figure 12:
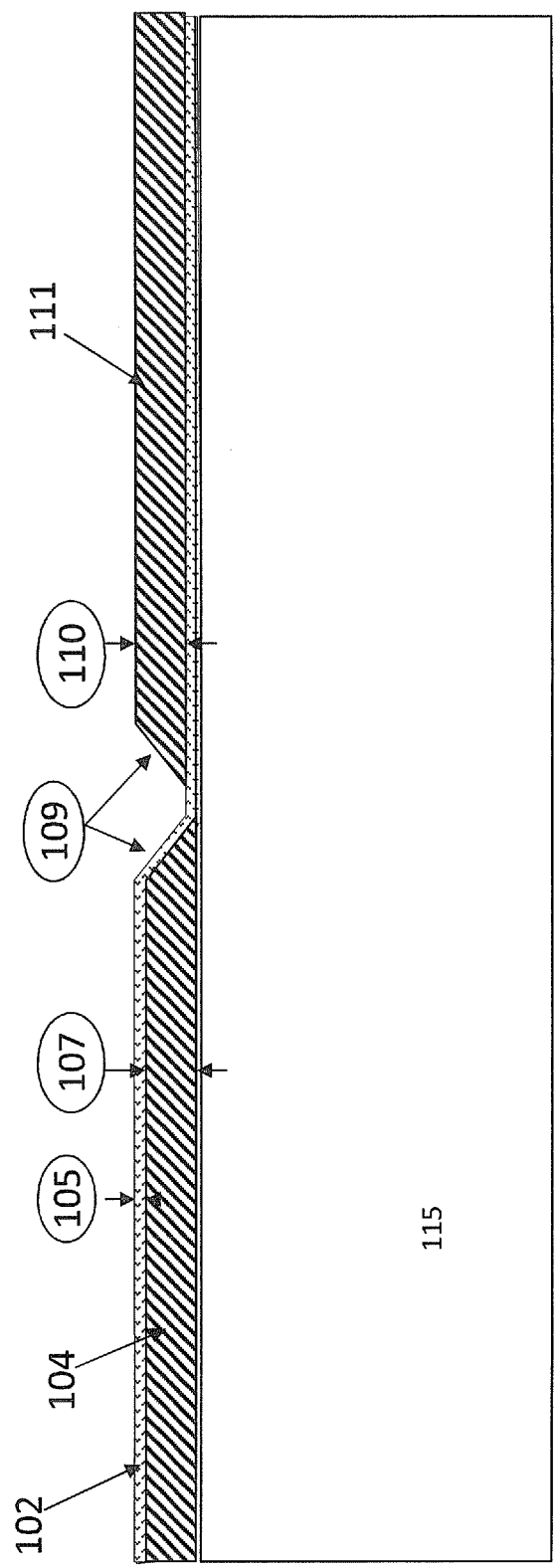
Figure 13:
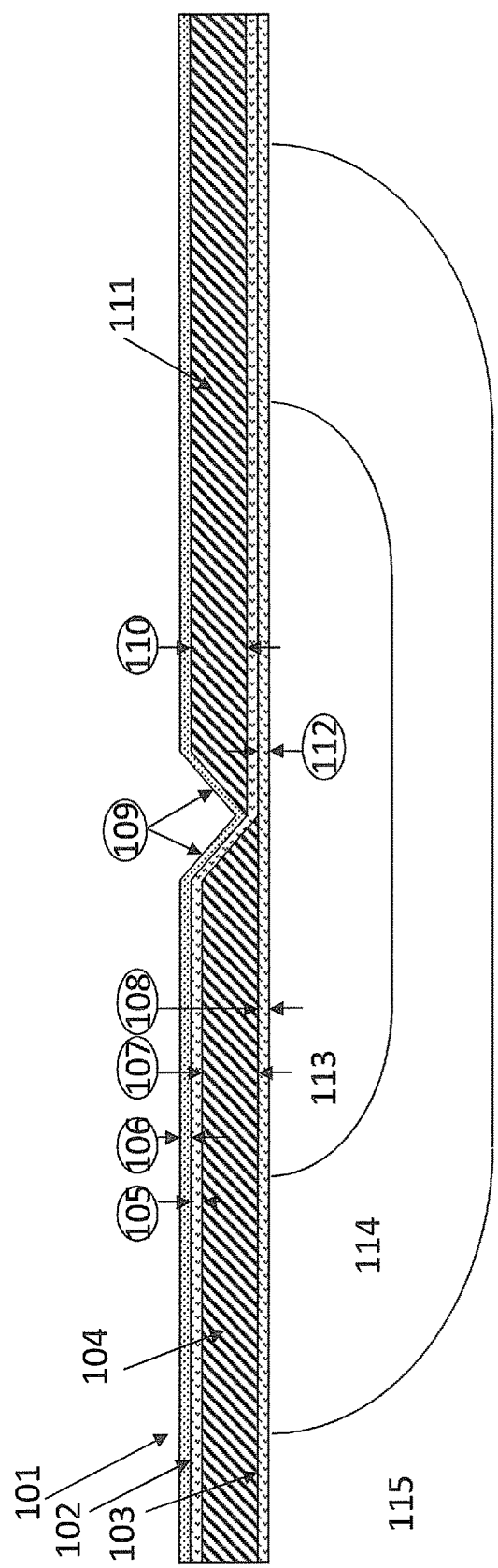
Figure 14:
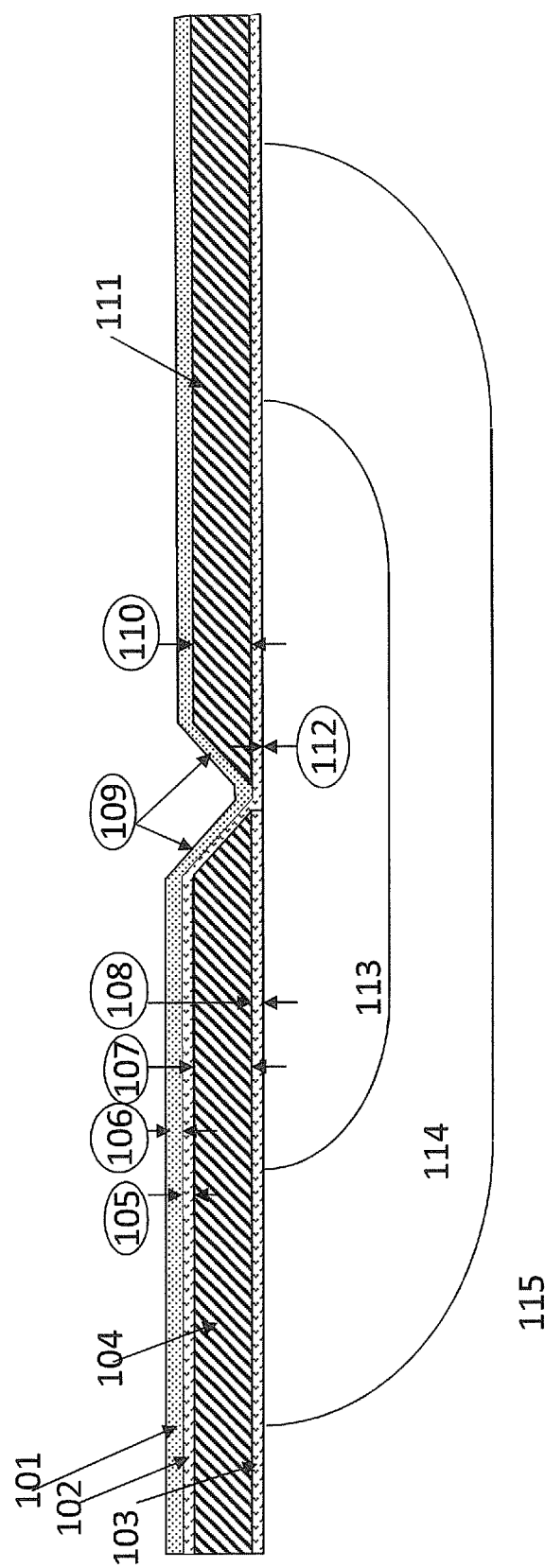

The invention will be described in detail below with reference to different embodiments and to the drawing. Specifically, the Figures show:

FIG. 1 a cross section of a part of the structure of a solid-state spectrometer according to a first embodiment, FIG. 2 a cross section of a modified embodiment according to a second embodiment of the spectrometer, FIG. 3 the use of the solid-state spectrometer of the two embodiments in FIGS. 1 and 2, in combination with a polarization filter, FIG. 4 in a general manner, another embodiment of a spectrometer in cross section, with thermopile elements as radiation-selective elements, FIG. 5 a top plan view on the advantageously provided offset between the windows of two aperture masks in two dimensions, FIG. 6 a block diagram of the wiring of the spectrometer for the evaluation of the radiation received, FIG. 7 an example for the signal evaluation performed to provide the intensities of the spectrum examined, FIGS. 8 and 9 diagrams for clarification of the principles of the evaluation of the spectrometer signals, FIG. 10 a FTDT model of a slit on an Si substrate, FIG. 11 an illustration of the wavelength-dependent intensity of the E-field as a function of the slit width, FIGS. 12 to 14
three embodiments of micro-optical filter designs for wavelength selection for use in a spectrometer, and FIGS. 15 to 31
an exemplary process step sequence for the manufacture of a micro-optical filter in CMOS technology.

Before embodiments of micro-optical filters are addressed with reference to FIG. 12 *ff*, first, two embodiments of a solid-state spectrometer will be described with reference to FIGS. 1 to 11, representing a possible, yet preferred application for such a filter.

FIG. 1 is a perspective and sectional view of an exemplary solid-state spectrometer 10 according to a first embodiment. The solid-state spectrometer 10 comprises a (silicon) semiconductor substrate 12, generally weakly p-doped, which has an n-doped (trough) area 14 implanted in its near-surface region. A silicon oxide layer 18 is located on the upper side 16 of the semiconductor substrate 12. On the silicon oxide layer 18, a first aperture mask 20 is located that is made of polycrystalline silicon, for example. This first aperture mask 20 has narrow first windows 22, each having the same width. In this embodiment, these windows 22 are filled with a material 26 permeable to the radiation of interest. The material of the first aperture mask 20 is impermeable to radiation in the wavelength range of interest.

After application of the first aperture mask 20 (and prior to filling the first windows 22), a p implantation is performed via the first windows 22 so that p-doped regions 28 form in the n-doped area 14. Thereby, pn junctions are formed that form photodiodes 30 sensitive to the radiation of interest.

Situated on the first aperture mask 20 is a second aperture mask 32 which is made of metal or a metal alloy, for example, and is also impermeable to the radiation in the wavelength range of interest. The second aperture mask 32 has second windows 36 between its regions 34 impermeable to radiation. The second windows 36 of the second aperture mask 32 partly overlap with the first windows 22 of the first aperture mask 20, wherein opposite longitudinal edges 38, 40 of the overlapping first windows 22 of the first aperture mask 20 and the second windows 36 of the second aperture mask 32 form radiation passage openings 42 differing in width. The reason for this is that centre-to-centre distance (pitch) between the uniformly spaced adjacent first windows 22 differs from the centre-to-centre distance (pitch) of the also uniformly spaced adjacent second windows 36. Similar to a nonius, a gap width 44 is obtained that varies from radiation passage opening 42 to radiation passage opening 42. By forming the radiation passage openings 42 using two lithography planes, the change in the gap width 44 of adjacent radiation passage openings 42 can be controlled and adjusted with extremely high accuracy. The manufacturing accuracy of the edges 38 with respect to adjacent edges 38 of the aperture mask 20 and of the edges 40 with respect to the adjacent edges 40 of the aperture mask 32 is extremely high (with normal CMOS processes, for example, it is in the singe-digit nm range), whereas, as far as the sizes of the first and second windows 22, 36, as well as the precision with which a window 22 of the first aperture mask can be adjusted with respect to a window 36 of the second aperture mask, are concerned, the two tolerances are greater by approximately two orders of magnitude, i.e. they are typically in the three-digit nm range. On the second aperture mask 32, a passivation layer 46 is provided that is permeable to radiation at least in the wavelength range of interest.

For a highly accurate manufacture of the solid-state spectrometer of FIG. 1 or of the present invention, it not decisive either that certain radiation passage openings 42, i.e. radiation passage openings 42 fixed with respect to their position on the chip produced, have the respective specified gap widths. Rather, the solid-state spectrometer can be manufactured such that considerably more radiation passage openings with their associated photodiodes or radiation-sensitive elements are produced than necessary. In a process following manufacture, those radiation passage openings 42 are selected during calibration of the solid-state spectrometer that have the desired variations in gap widths required for the wavelength range of interest.

Different radiation portions pass through each of the openings of the radiation passage openings 42 that vary in their gap width with a constant pitch. With reference to FIG. 1, this means in particular that radiation up to a wavelength defined by the gap width 44 of this radiation passage opening passes the radiation passage opening 42 shown on the left. Besides radiation with wavelengths that also pass the left radiation passage opening, further radiation passes the intermediate radiation passage opening 42, having wavelengths that are basically defined by the larger gap width 44. (Cf. P. Morse, P. J. Rubenstein; The Diffraction of Waves by Ribbons and by Slits; Physical Review; Vol. 54; Dec. $1^{st}$ 1938; p. 895-898). Correspondingly, the even wider radiation passage opening 42 on the right allows radiation to pass that also passes the intermediate radiation passage opening 42, while, in addition, radiation with longer wavelengths can pass through the radiation passage opening 42 on the right.

As will be described in the following, this fact will be taken into account in the evaluation of the radiation intensities within the spectrum of interest.

FIG. 2 shows an alternative embodiment of a solid-body spectrometer 10', wherein, in FIG. 2, those elements and layers which correspond to or are identical with those of the spectrometer 10 of FIG. 1 are provided with same reference numerals as in FIG. 1.

As can be seen, the design of the solid-body spectrometer 10' inclusive of the first aperture mask 20 corresponds to that of spectrometer 10 of FIG. 1. In contrast to the spectrometer 10 of FIG. 1, the second aperture mask 32 of spectrometer 10' of FIG. 2 comprises radiation-impermeable areas 34 arranged in a centered configuration above the first windows 22 of first aperture mask 20. On both sides of these radiation-impermeable areas 34, there will then exist gap-shaped radiation passages 42 having gap widths 44 which are identical in a pair-wise manner.

FIG. 3 schematically illustrates the use of a polarization filter 48 in connection with the solid-body spectrometer 10 and respectively 10' of FIGS. 1 and respectively 2. In the (first) span axis 50 in which the first and second windows 22,36 extend, the radiation passages 42 have a varying gap width (as described above). In the span axis 52 extending at a right angle to the first span axis 50, the radiation passages have substantially identical diameters. The wavelength selectivity is thus generated in the first span axis 50 so that the polarization filter 48 will provide for a corresponding filtration of the incident radiation which is to be examined. This is shown in FIG. 3. Radiation with an e-field vector 54 extending in the longitudinal direction (axis 52) of the slit-shaped radiation passages 42 is allowed to pass, while radiation whose e-field vector 55 extends in the width dimension of the slit-shaped radiation passages 42, (see axis 50) will be blocked and shielded.

FIG. 4 shows a further embodiment of a solid-body spectrometer 10", wherein it applies also here that, in FIG. 4, those layers and elements which correspond to or are functionally identical with those of the spectrometer 10 of FIG. 1 are provided with same reference numerals as in FIG. 1.

The upper part of solid-body spectrometer 10" of FIG. 4 is identical with the layers according to FIG. 1 arranged above silicon oxide layer 18 and the layers above these layers (first and second aperture masks 20,32 and passivation layer 46).

The spectrometer 10" of FIG. 4 is provided, instead of the photodiodes 30 of solid-body spectrometers 10 and 10' of FIGS. 1 and 2, with thermopile elements 56 as radiation-sensitive elements. Each thermopile element 56 consists of two conductors 58,60 which are electrically connected to each other at a crossing point 62. The two conductors 58,60 comprise materials with different work function. These can be e.g. pairs of n-doped and p-doped silicon or, on the other hand, of polycrystalline silicon and metal (aluminum). Due to the different work functions, a thermo voltage is generated between the two conductors 58,60 at the site of the electric contact (crossing point 62). The thermo voltage is dependent on the temperature of the contact. In the exemplary embodiment according to FIG. 4, the crossing point 62 is cooled by a (silicon) membrane 64 on which the conductors 58,60 are arranged, and by the substrate 12 (non-intended). In order to minimize this cooling effect, the membrane 64 is typically given a largely thin design. For the same reason, namely minimizing the cooling effect, cavities 66,68 are formed in the substrate 12 above and below membrane 64 which are evacuated. These cavities 66,68 are generated e.g. by micromechanically prefabricated wafers which will be bonded, i.e. fusion-contacted, with each other, as known from the production of e.g. MEMS pressure sensors with buried cavities.

The upper wafer 70 is typically designed as an insulator or is provided with an additional insulation layer, not shown in FIG. 4 for reasons of better survey, for short-circuiting the conductors 58.60. The upper cavities 66 are closed by a further membrane 72 on which the aperture masks are formed as described in the context of FIG. 1.

The design according to FIG. 4, comprising the thermopile elements 56 as radiation-sensitive elements, serves particularly for examination of spectra in the infrared range. If the spectrometer 10" is subjected to infrared radiation, the thermopile elements 56 will heat up until the heat discharge via the substrate and the heat inflow through the infrared radiation, which will pass in a wavelength-selective manner through the radiation passages, are in equilibrium. Since the radiation passages operate in a wave-selective manner, the thermopile elements 56 will heat up differently and will thus provide different thermo voltages which can then be assigned to the respective received infrared radiation.

For the production of the aperture masks, materials should be used which reflect infrared radiation. Thus, particularly metal (e.g. aluminum) will be suited while e.g. silicon will be unsuited because it will allow the passage of infrared radiation of a wavelength above 1300 nm.

FIG. 5 shows a plan view of an aperture mask arrangement with two-dimensional aperture mask 20 displacement for the generation of radiation passages, having different sizes in two dimensions, of a solid-body spectrometer 10''' according to a further exemplary embodiment. In such an arrangement wherein the radiation passages are thus varying by respective constant amounts both in their width and their lengths (when viewing mutually adjacent radiation passages), the polarization filtering of the to-be-examined radiation can be omitted.

FIG. 6 shows, schematically and in the form of a block diagram, a possible circuit configuration of a solid-body spectrometer according to any one of the above described embodiments for calibration purposes. As already mentioned above, it cannot be reliably stated in advance that a locally fixed radiation passage of the produced chip will really allow passage of that radiation which, according to the production process and the arrangement of the radiation passage, is actually intended to pass. The production process according to which the aperture masks with their one- or two-dimensional mutual displacement are generated, will guarantee that, in any case, there will have been generated as many radiation passages with those sizes as are required for the wavelength range of interest and in the desired resolution of the spectrometer. This means that, after production, one will have to define and identify those radiation passages which are required for the examination of the spectrum of interest.

An arrangement for performing this calibration is shown in FIG. 6. Therein, 10 (and resp. 10', 10" and 10''') designates the solid-body spectrometer. The spectrometer can be accommodated in a housing 74. This housing 74 comprises an optical window 76 through which the to-be-measured radiation can fall onto the spectrometer 10 (10',10",10'''). The optical window has to be permeable to the radiation of interest, i.e. the spectrum that is to measured. It can comprise a polarization filter. Further, it can shield off non-interesting radiation and radiation of disturbing spatial directions (polarization). The signals of the radiation-sensitive elements of the spectrometer 10 (10',10",10''') are dependent on the spectral composition of the incident radiation.

According to FIG. 6, the output signals of spectrometer 10 (10',10",10''') will e.g. be converted digitally, namely in an evaluation circuit 78. In this case, the evaluation circuit 78 is connected via a bus 80 to a CPU 82. This CPU 82 will receive calibration and program data e.g. from a memory 84.

The program to be executed and the other fixedly predetermined data are taken from the CPU 82 and from the memory 84 which can be designed e.g. as a read-only memory. Variable data are taken from a RAM 86. Of course, apart from Havard architecture described herein, also other architectures such as e.g. a Von-Neumann architecture are possible. The CPU 82 communicates via an I/O circuit 88 with components arranged externally of those shown in the block diagram according to FIG. 6. This is performed e.g. via a standard bus 90.

The individual radiation-sensitive elements of spectrometer 10 (10',10",10''') are connected to each other e.g. in the manner shown in FIG. 7. Depicted in FIG. 7 is an example of the extraction of the intensities of the radiation for three wavelengths and by use of four radiation-sensitive elements.

According to FIG. 7, the arrangement is subdivided into an optical left-hand part and an electrical right-hand part. The optical radiation is incident, as shown in FIG. 7, onto the spectrometer 10 (10',10",10'''). Designated by 92 are the wavelength-sensitive filters as formed by the aperture mask arrangement of spectrometer 10 (10',10",10'''). The optical filters 92 have a high-pass character. In the example illustrated in FIG. 7, the uppermost optical filter 92 is to have a larger limit wavelength than the next lower optical filter 92. The latter in turn has a larger limit wavelength than the next lower optical filter 92 (and so forth).

The remaining optical signal will be converted into an electric signal by an optical converter, namely by the radiation-sensitive elements of spectrometer 10 (10',10",10'''). The radiation-sensitive element can be a photodiode (pn diode), a thermopile element or e.g. a CCD element. If required, the output signals of these elements will be amplified, which is not shown in FIG. 7. The intensity signals obtained in this manner will be supplied to subtraction circuits 94 in which, by subtraction, a difference signal with bandpass character will be generated in relation to the incident radiation.

Hereunder, with reference to the diagrams of FIGS. 8 and 9, an example will be given of the evaluation of the signals of a (calibrated) solid-body spectrometer e.g. according to any one of the embodiments shown in FIG. 1, 2, 4 or 5. Described hereunder is an exemplary method by which, from the output signals of the radiation-sensitive elements, i.e. for example with respect to FIGS. 1, 2 and 4, from the diode and respectively thermo voltages $U_i(\lambda)$, there can be computed a discretizised spectrum $S_i(\lambda)$.

The diode sensitivity $E_i(\lambda)$ can be approximated by the function indicated in FIG. 8a for an ideal gap as a radiation passage. The values are quoted from the publication: P. Morse, P. J. Rubenstein; The Diffraction of Waves by Ribbons and by Slits; Physical Review; Vol. 54; Dec. 1st 1938; p. 895-898.

The value d herein represents the effective width of the slot, and λ represents the wavelength of the incident light. Herein, it is assumed that the polarization of the light is selected in such a manner that the e-field vector is parallel to the slot. If the wave nature of the light is neglected, the transmission of the light through the gap will be reduced already because the surface area is becoming smaller along with the decreasing d. This is represented by the curve 96. The curve 97 indicates the theoretical development of the sensitivity alone due to the wave nature of the light. Herein, the reduction of the transmission caused by effects of the geometric optics, as represented by curve 95, is not considered yet. Curve 95 represents the combination of both effects, i.e. of curves 96 and 97.

For d>0.4λ, curve 95 follows curve 96. For d>0.4λ, the transmission will obey the geometric optics and in so far is not wavelength-sensitive.

For d<0.4λ, the curve will follow a combination of curves 97 and 96. In this range, the curve is wavelength-sensitive.

In these considerations, the wavelength dependency of the actual photoelement—such as e.g. a Si-photodiode—has been neglected. Thus, for short wavelengths, the light does pass the gap; however, since the surface area of the gap is proportionate to the gap width, the sensitivity of the photodiodes increases will increase in proportion to the gap width.

A finite discrete time-domain (FDTD) simulation, with a suitable construction e.g. corresponding to FIG. 10 and with a suitable design of all materials, will result in a wavelength sensitivity as represented in FIG. 11. Due to the design of the window, the waves after passing through the radiation passage 42 between the two aperture masks 20,32 will propagate obliquely in the substrate. Typically, this holds true of all diaphragms having their lower edges on different planes. As evident from FIG. 10, the mutually opposite edges 38,40—defining a radiation passage 42—of the windows 22,24 of the two aperture masks 20,32 are beveled in opposite senses, wherein the selection of the bevels (in aperture mask 32, directed upward to the right, and in aperture mask 20, directed downward to the right—in the representation of FIG. 10) can also be exchanged. It is decisive in this regard that the bevels of said edges 38,40 do not extend in parallel but at an angle unequal to 0°. This will exactly avoid those interferences and resonances which in the state of the art, e.g. in US-A-2006/0044429, are used for generating the wavelength dependency while, however, being rather counterproductive for the application in the solid-body spectrometer described herein. An expert in the field will thus always see to it that the residual waviness—represented in FIG. 11—for the wavelength sensitivity of the optical filter, which has to be attributed exactly to those parasitic resonances, will be minimized already in the construction phase, e.g. by FDTD simulation and by adaptation of the construction and the material, and will be approximated to the development according to FIG. 8.

In order to make it possible to compute the later characteristic of an entire spectrometer, it will first be necessary to indicate the characteristic of an individual diode.

For short wavelengths $\lambda_e$ of the incident radiation, the output signal of the i-th diode is proportionately dependent on the gap width $d_i$ thereof. With these short wavelength, one can thus assume that the transmission through the gap filter is not dependent on $\lambda_e$.

This dependency exists only due to the gap opening area $A_i=d_i*l_i$ which is dependent on the gap width $d_i$ and the gap length $l_i$ and which, proportionately to $d_i$, will allow more or less light to pass.

If, due to the incident light, the value $\lambda_e>2.5*d_i$ is exceed and respectively if $d_i$ is smaller than $\lambda_e>0.4$, the transmission through the gap filter will be dampened.

In the range of long wavelengths with $\lambda_e>2.5*d_i$, this damping d(λ) amounts to: $-290 \text{ dB}*(d_i/\lambda_e)$.

Such a damping corresponds to the function:

$$D_i(\lambda_e) = \left(1 - \frac{1}{1 + \frac{d_i}{\lambda_{ej}}}\right) * D_{0j} = \left(1 - \frac{1}{1 + \frac{\lambda_{ej}}{d_i}}\right) * D_{0j}$$

Herein, $\lambda_e$ represents the wavelength of the incident radiation, $\lambda_{ej}$ represents the j-th wavelength of a packet of incident radiation of discrete individual wavelengths, $D_{0j}$ represents the sensor signal upon irradiation with this j-th wavelength (This reflects the characteristic of the sensor element), and $d_i$ represents the gap width of the i-th element (Herein, it is assumed that all sensor elements are identical).

This formula will be referred to hereunder as highpass approximation.

In FIG. 9, the curve of FIG. 8 is shown in comparison with the theoretical development 98.

As can be seen, said highpass approximation will approximate the behavior with positionally correct radiation in a very correct manner. Thus, for a discrete incident spectrum S consisting of the intensities $S_i$ of the individual wavelengths $\lambda_{ej}$:

$$S = \sum_{i=1}^{n} S_i(\lambda_{ei})$$

there results a overall diode signal of:

$$D_j = \sum_{i=1}^{n} \left(\frac{1}{1 + \frac{\lambda_{ei}}{d_j}}\right) * D_{0i} * S_i(\lambda_{ei})$$

Evidently, this equation can be converted into a matrix equation, namely with $$\vec{D} = (D_1(S), D_2(S), D_3(S), \ldots D_{n-1}(S), D_n(S),) \text{ and}$$

$$\vec{S}(S_1(\lambda_{e1}), S_2(\lambda_{e2}), S_3(\lambda_{e3}), \ldots S_1(\lambda_{e(n-1)}), S_1(\lambda_{en}),)$$
and $$\overleftrightarrow{A} = \begin{pmatrix} A_{11} & A_{12} & A_{13} & \ldots & A_{1(n-1)} & A_{1n} \\ A_{21} & A_{22} & A_{23} & \ldots & A_{1(n-1)} & A_{1n} \\ A_{31} & A_{32} & A_{33} & \ldots & A_{1(n-1)} & A_{1n} \\ \ldots & \ldots & \ldots & \ldots & \ldots & \ldots \\ A_{(n-1)1} & A_{(n-1)2} & A_{(n-1)3} & \ldots & A_{(n-1)(n-1)} & A_{(n-1)n} \\ A_{n1} & A_{n2} & A_{n3} & \ldots & A_{n(n-1)} & A_{nn} \end{pmatrix}$$

and with $$A_{ij} = \left( \frac{1}{1 + \frac{\lambda_{ei}}{d_j}} \right) * D_{0i}$$

In this case, the equation for the overall diode signals can be written as:

$$\vec{D} = \overleftrightarrow{A} * \vec{S}$$

It is evident that this equation can be solved from the left through multiplication by the matrix $A^{-1}$ which is the inverse of A:

$$\overleftrightarrow{A}^{-1} * \vec{D} = \overleftrightarrow{A}^{-1} * \overleftrightarrow{A} * \vec{S} = \vec{S}$$

It is a precondition for the existence of this matrix that the matrix is regular. This means that its ranking is equal to the number of diodes and spectral components. This is the case if each row vector is not collinear with each other row vector and respectively case if each column vector is not collinear with each other column vector.

The required regularity of the n×n-matrix is technically achieved in a predictable manner by n slit diaphragms (42) with n different slit widths (44) above the n sensor elements (30). Due to this predictability, the calibration expenditure is considerably reduced.

With reference to FIGS. 12 to 31, the to-be-produced sensor element with appertaining radiation passage opening and the process for its manufacture will be explained.

FIG. 12 shows the basic construction of a micro-optical filter having a pinhole diaphragm allowing the passage of wavelengths smaller than or equal to a wavelength of interest, notably largely in a disturbance- and resonance-free manner.

On a carrier, e.g. a glass or silicon wafer 115, there is produced a first optical mask 104. This mask will be provided with an edge 109. The generation of the edge 109 is preferably performed by photolithography and suitably in such a manner that the edge 109 will not be right-angled but, as shown in FIG. 12, beveled. This has the purpose that the generation of a resonator with the edge of the second diaphragm, which is still to be described, will be avoided or that the resonator, if not entirely avoidable, can at least be provided with an increased damping effect in that reflections at the edges of the diaphragms will be guided away from the wafer 115, i.e. that the reflected radiation portion does not pass the filter.

On the first diaphragm and on the wafer 115, a dielectric layer 102 is applied which is transparent in the wavelength range of interest. The thickness of this layer is preferably selected to be smaller than $\lambda/2$ and more preferably smaller than $\lambda/4$ for preventing the formation of a horizontal waveguide. Such a waveguide, due to resultant constructive and destructive resonances, would change the spectral properties as compared to the desired low-pass behavior of the later generated slit, which normally would be negative. On this layer in turn, there will be formed, preferably by photolithography, a further diaphragm 111 having a further edge 109. Preferably, also this edge 109 will be beveled so as to avoid or reduce resonances with the above described edge 109 of the first diaphragm.

In the ideal case, the two diaphragms 111 and 104 are made of a material suited for good absorption of the light in the wavelength range of interest. Such a material would be e.g. graphite or a black DLC film for the optical range. Normally, however, such materials are not CMOS-compatible. It has become evident that the use of titanium instead of aluminum will at least improve the results here.

FIG. 13 shows an example of a to-be-produced radiation-sensitive component and an appertaining modified radiation passage opening on basis of the general structure shown in FIG. 12. As an example of a component onto which the radiation passing through the passage opening will be incident, there will be considered herein a radiation-sensitive component in the form of the exemplary case of a p-n transition between a p-region 113 and an n-well 114 in the wafer 115. The n-well 114 is formed in this basically p-doted wafer 115 (base substrate). On the latter, there is now applied, for insulation against the diaphragm consisting of 104 and 111, an optically transparent insulating layer as thin as possible, for instance a dielectric first layer 103 formed e.g. as an $SiO_2$ layer. Tests have shown that it is suitable to also select the thickness 108 and respectively 112 of this first layer 103 to be as thin as possible, particularly thinner than $\lambda/2$ and preferably thinner than $\lambda/4$ of the shortest wavelength 2 that is to be detected. In an exemplary realization, this thickness 108 and respectively 112 is selected to be smaller than or equal to 70 nm. The advantage of this thin first (oxide) layer resides in that, as also with the layer 102 described above with reference to FIG. 12, it will prevent a propagation of electromagnetic waves in a lateral direction if the minimum wavelength 2 is not fallen under. If a plurality of radiation-sensitive components are arranged on/in a substrate (as is the case e.g. in a solid-body spectrometer as described above with reference to FIGS. 1 to 11), these radiation-sensitive components are separated/decoupled from each other. Further, undesired excess resonance and resonance damping are avoided.

This $SiO_2$ layer 103 has applied on it, as above, a first absorber 104. Due to the processes available in CMOS lines, it has been proven to be of advantage to produce this absorber 104 of titanium. Also other materials can be envisioned. Of particular advantage, for instance, would be graphite or a DLC film. The thickness 107 of the first absorber 104 is selected to the effect that light will not be able to pass through this absorber 104 in a significant quantity. If the absorber 104 is too thin, see the thickness dimension 107, the measurement result will later be superseded by an equivalent value. For titanium, it has proven to be of advantage to choose a minimum thickness 107 of 250 nm, preferably 300 nm. Titanium has the advantage to have a stronger absorption particularly in the blue near-UV range.

At the radiation passage opening, the edge 109 of absorber 104 can be beveled by a suitably selected etching process. This, as already described, leads to the avoidance and respectively reduction of a resonance with the edge 109 of the second absorber 111.

Onto the first absorber 104, there will be applied a thin, optically transparent and dielectric (second) intermediate layer 102, preferably again made of $SiO_2$. As above, its thickness 105 is again selected in the range<$\lambda/2$ and more preferably <$\lambda/4$, e.g. <70 nm, so as to prevent a wave propagation due to wave guidance in the oxide layer. In this respect, it is to be noted that the structuring of the first absorber 104 will cause a thinning of the first (oxide) layer 103 in the area of the surfaces which are open after the structuring. Thereby, the original thickness 112 of the first layer 103 will be typically reduced to values e.g. around 20 nm. After application of the second (intermediate) oxide layer 102, the total thickness of the double layer of thinned first layer 103 and second layer 102 below the second absorber 111 and above the substrate 115 will be in the range of about 90 nm. In case that this should cause problems due to wave propagation in the direction of another photosensitive element because of wave guidance, the second oxide layer 102 should be made thinner. It can also be envisioned to completely remove the first (oxide) layer 103 in the region which is not covered by the first diaphragm 104, notably by over-etching during the metal structuring, i.e. to set the measure 112 to zero (FIG. 14).

Returning to FIG. 13, the second absorber 111 will be deposited as a mask onto the second (oxide) layer 102 and will be structured by way of photolithography. Also this second absorber 111 is typically produced of the same absorbing material as the first absorber 104. As already described above, the edges of the two absorbers define the radiation passage opening. The etching process can, as above, be performed to the effect the absorber edge 109, e.g. by way of beveling, will form no resonator with the opposite edge 109 of the first absorber.

By the final $Si_3N_4$ layer 101, the device will be passivated (sealed) and protected from humidity. In cases where the component can be hermetically sealed in some other manner, the passivation layer 101 can be omitted since this layer can possibly cause further resonances which may have a disturbing effect.

With reference to FIGS. 15 to 31 described hereunder, the process for manufacturing a corresponding exemplary device on silicon basis will be explained.

Figure 17:
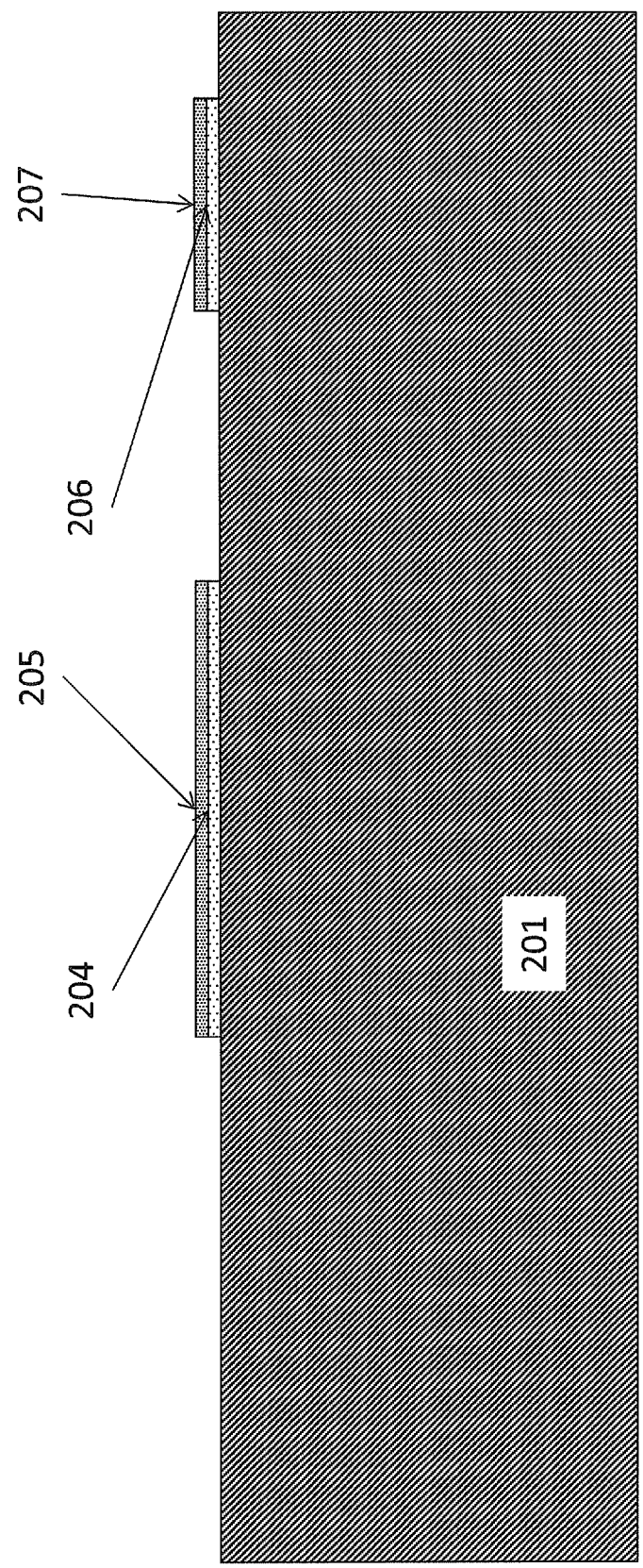

The base wafer 201, e.g. a p-doped silicon wafer having a conductivity value of 10 $\Omega$cm and a 15 $\mu$m epi-layer with a doping of $1.3*10^{15}$ cm$^{-3}$, will first be cleaned with the aid of processes usually applied in the CMOS field and will be marked. In the next step (FIG. 16), for producing a hard mask, there is generated e.g. a thin thermal oxide of 15 nm, 202. Onto this, a thin $Si_3N_4$ layer 203 of e.g. 150 nm is applied. This is followed by a photolithographic structuring of these two layers. There are generated, on the one hand, islands which mark the active region of the later generated photosensitive sensor element 204,205, and a masking of the later contact regions 206,207 (FIG. 17)

Figure 18:
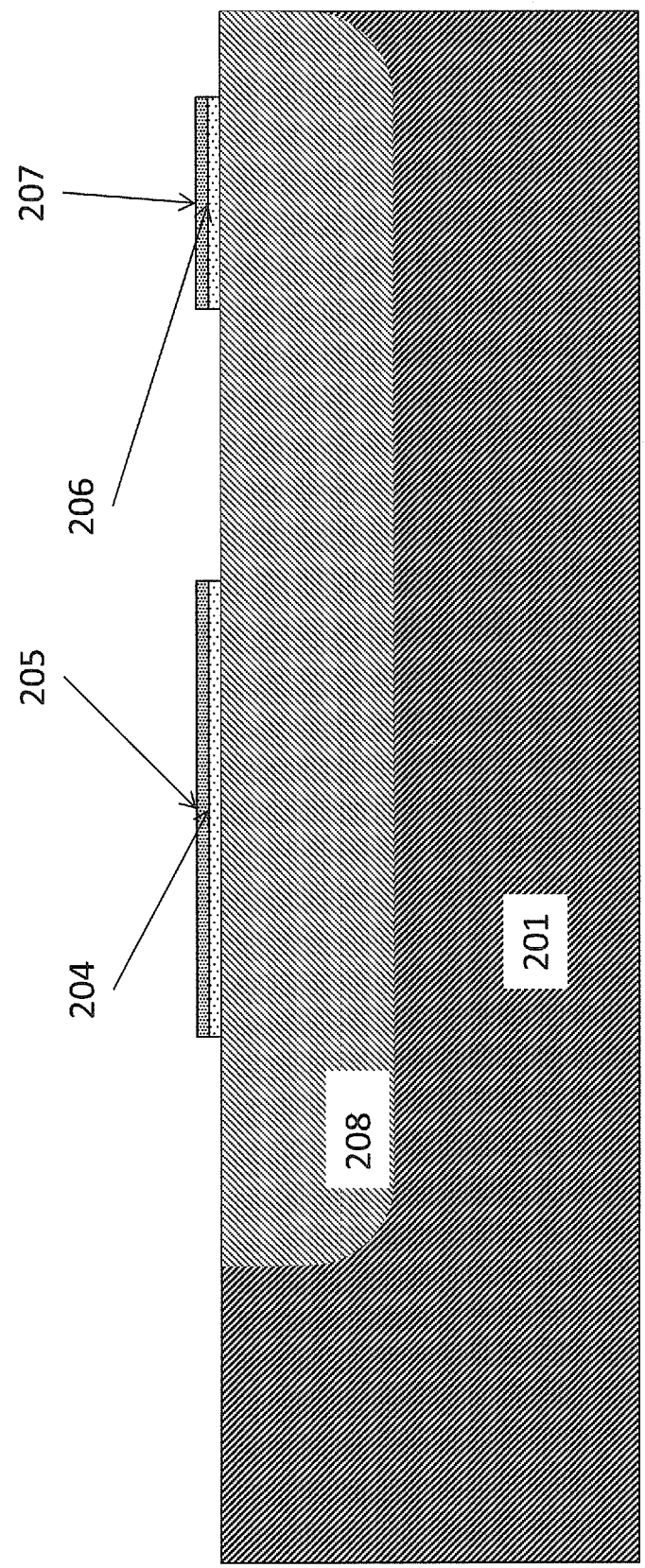

With the aid of a further photo technology, the later n-well 208 is formed in the substrate 201 by implantation. In doing so, the implanting is performed through the hard masks 204,205. An exemplary dose is $3*10^{12}$ cm$^{-2}$ P. (FIG. 18).

Figure 19:
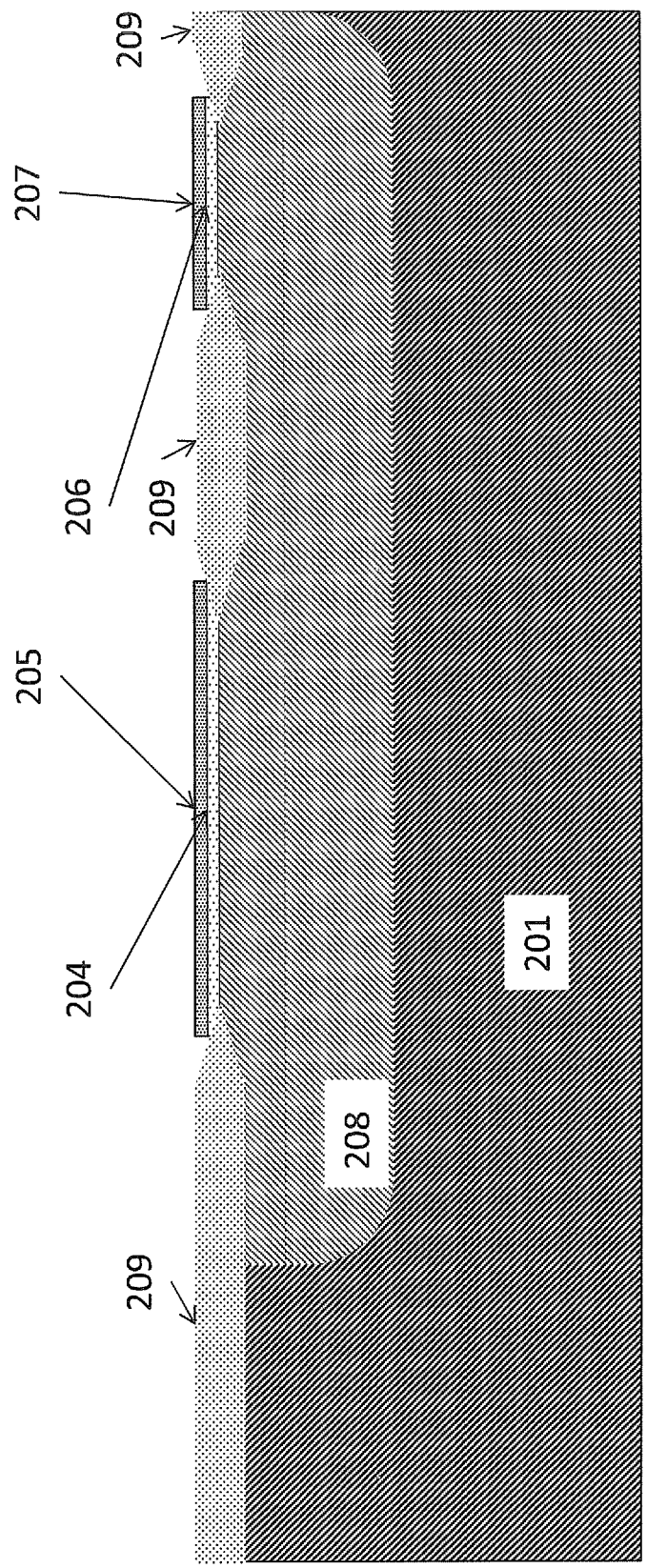

In a thermal oven process, the exposed surfaces are thermally oxidized (FIG. 19). There are generated field oxide areas 209 which serve for suppression of parasitic MOS transistors (FIG. 19). A typical thickness of the field oxide is 300 nm. On the surfaces of the wafer covered by the hard mask areas, no substantial additional oxide is generated.

Figure 20:
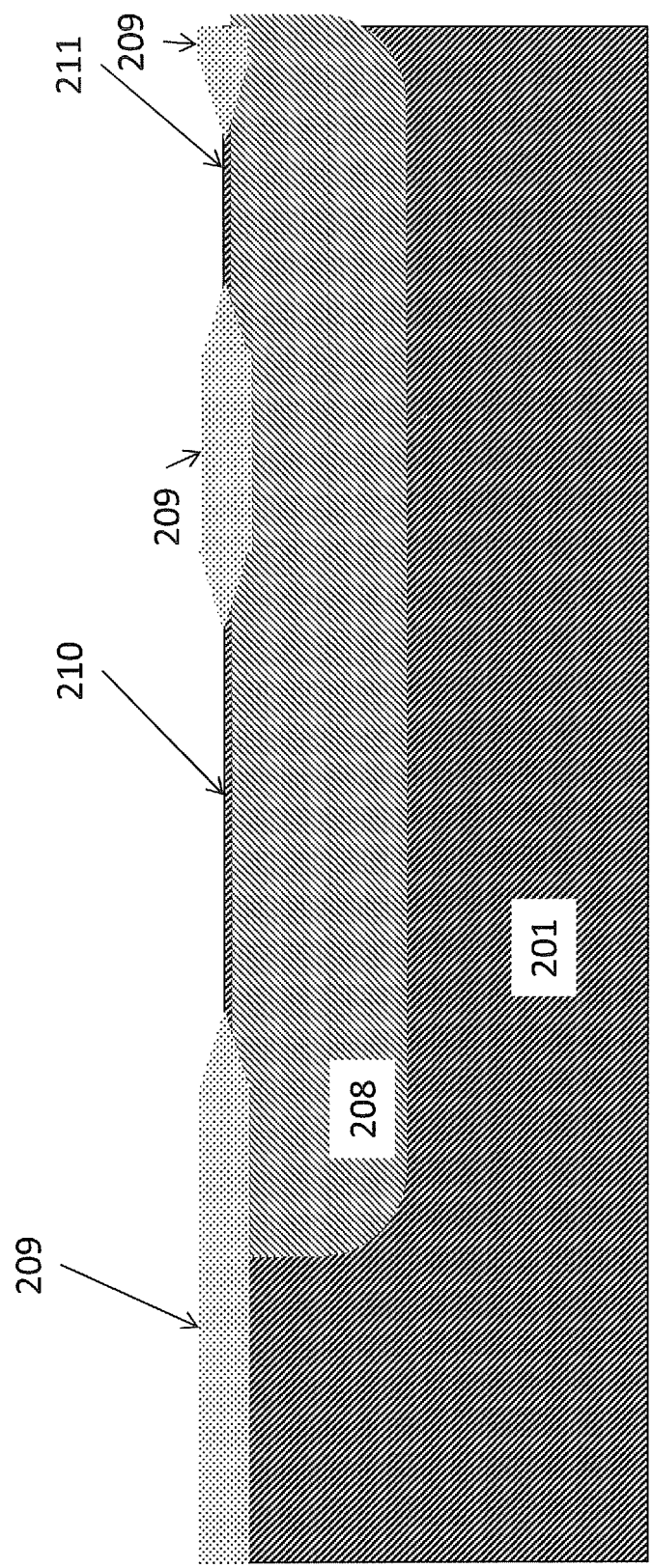

In a further etching step, the hard masks 204,205 are removed. There will remain the windows in the field oxide 209 for the photosensitive component 210 and the contacts 211 (FIG. 20).

Figure 21:
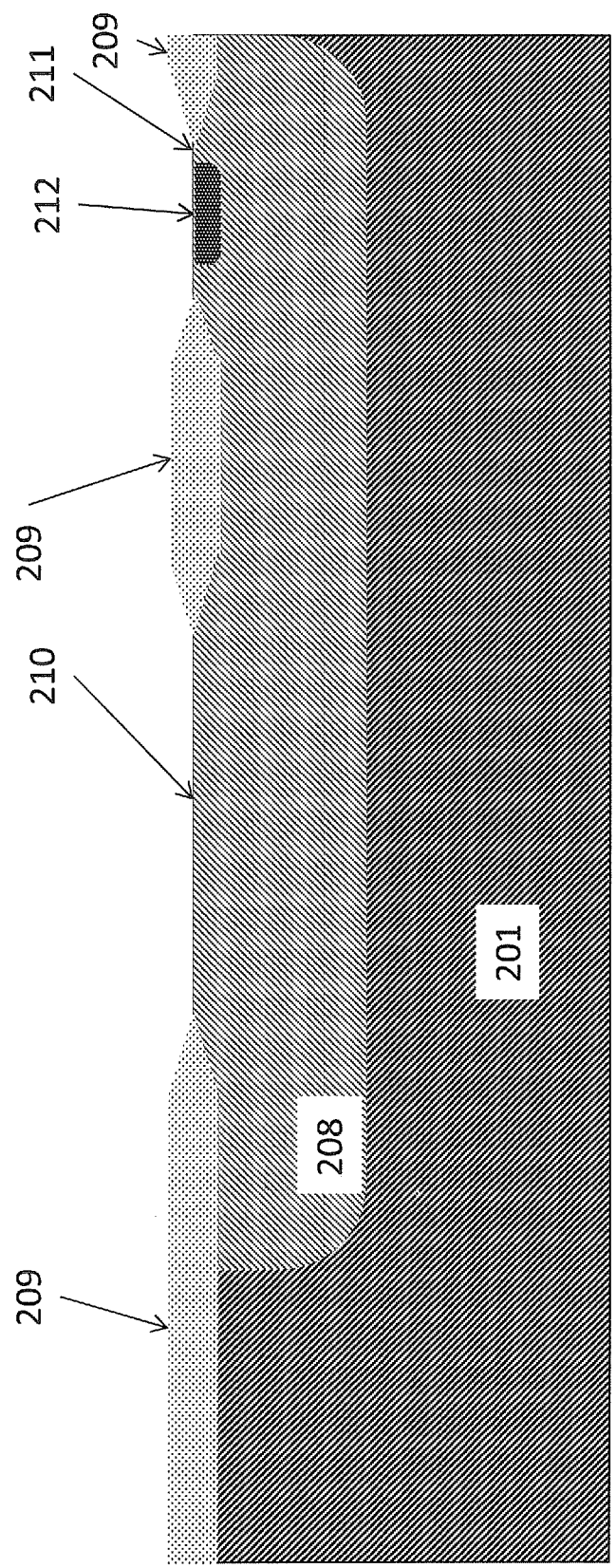

With the aid of a further photo technology, the contact to the n-well 212 are produced by implantation. An exemplary dose is $5*10^{15}$ cm$^{-2}$ phosphor (FIG. 21).

Figure 22:
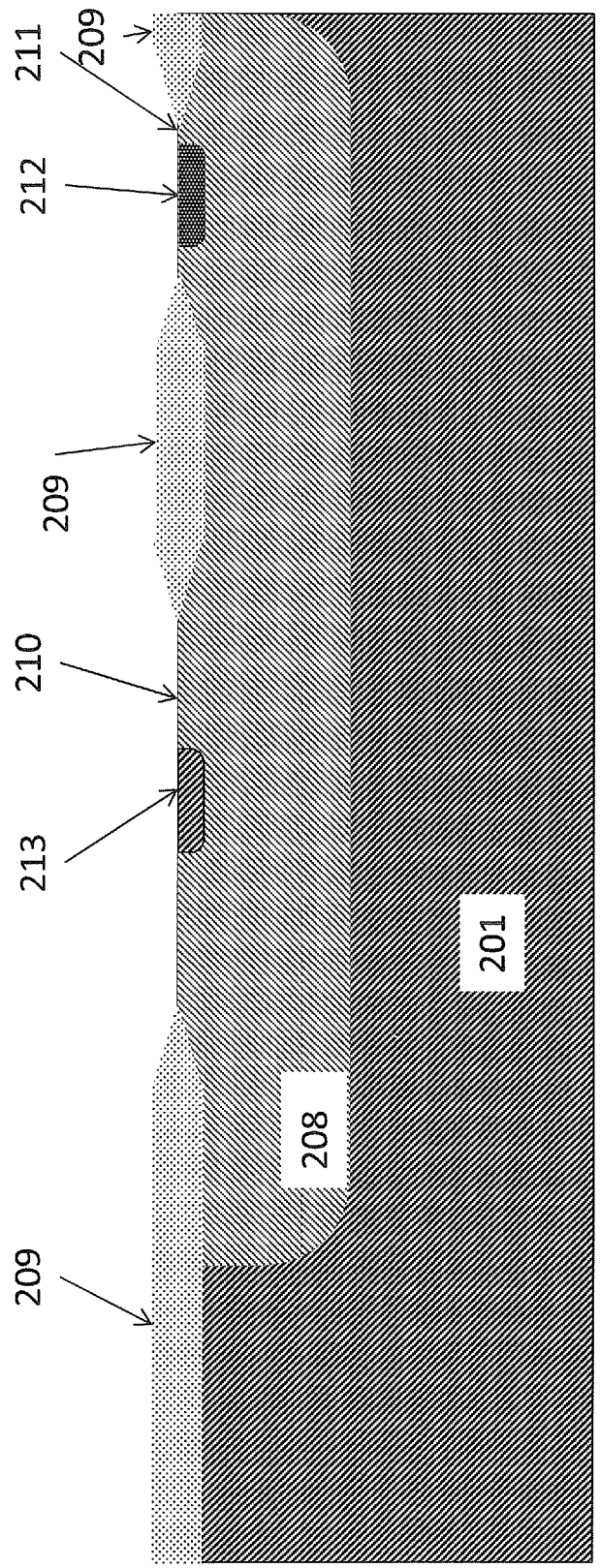

With the aid of a further photo technology, the p-region of the photosensitive component 213 is produced by implantation. An exemplary dose is $1*10^{15}$ cm$^{-2}$ boron (FIG. 22). The later contact to this component is established in the same step as the contact to the n-well. For the sake of better survey, this contact is not shown in this sequence of Figures.

Figure 23:
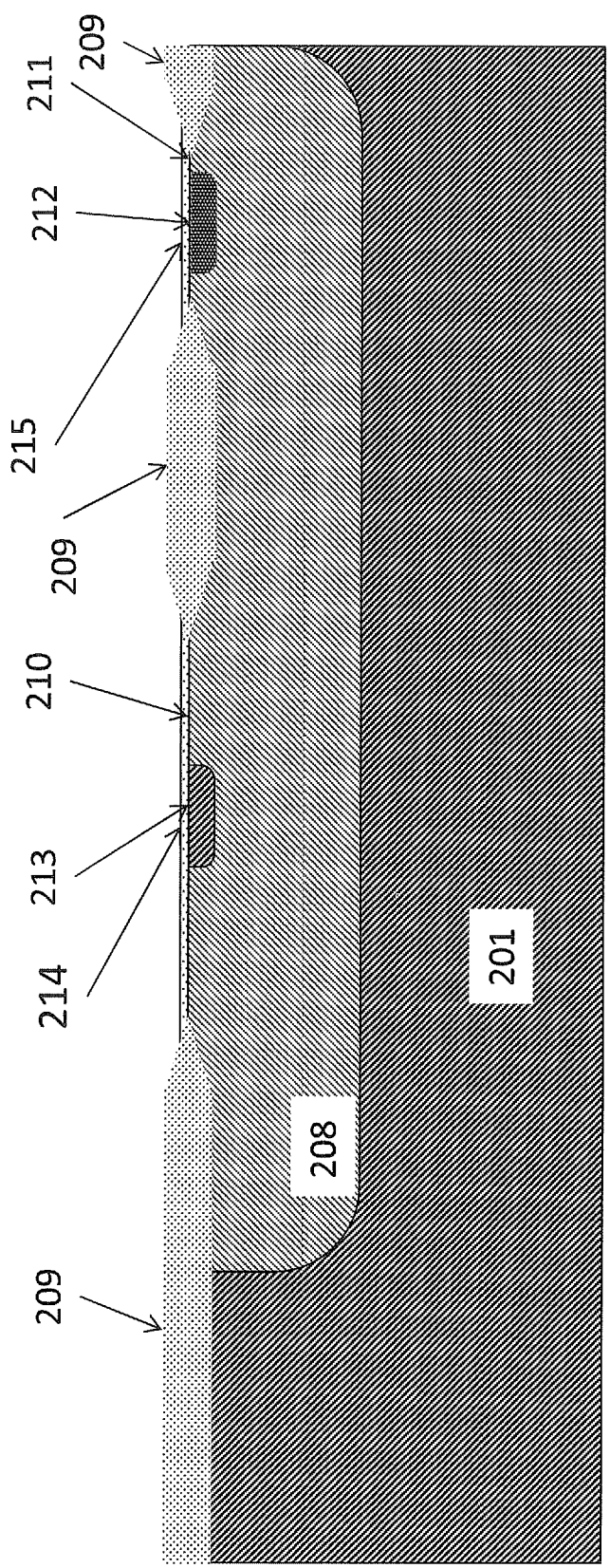

After a cleaning step, the thin oxide will separated both in the window for realizing the photoelectric component 214 and in the contact windows 215. These oxide layers correspond to the above described oxides 103 and (102) (FIG. 23). The thickness of this oxide should be smaller than $\lambda/4$. For instance, thicknesses smaller than 70 nm are favorable. Such manufacturing processes are known from the production of gate oxides.

Figure 24:
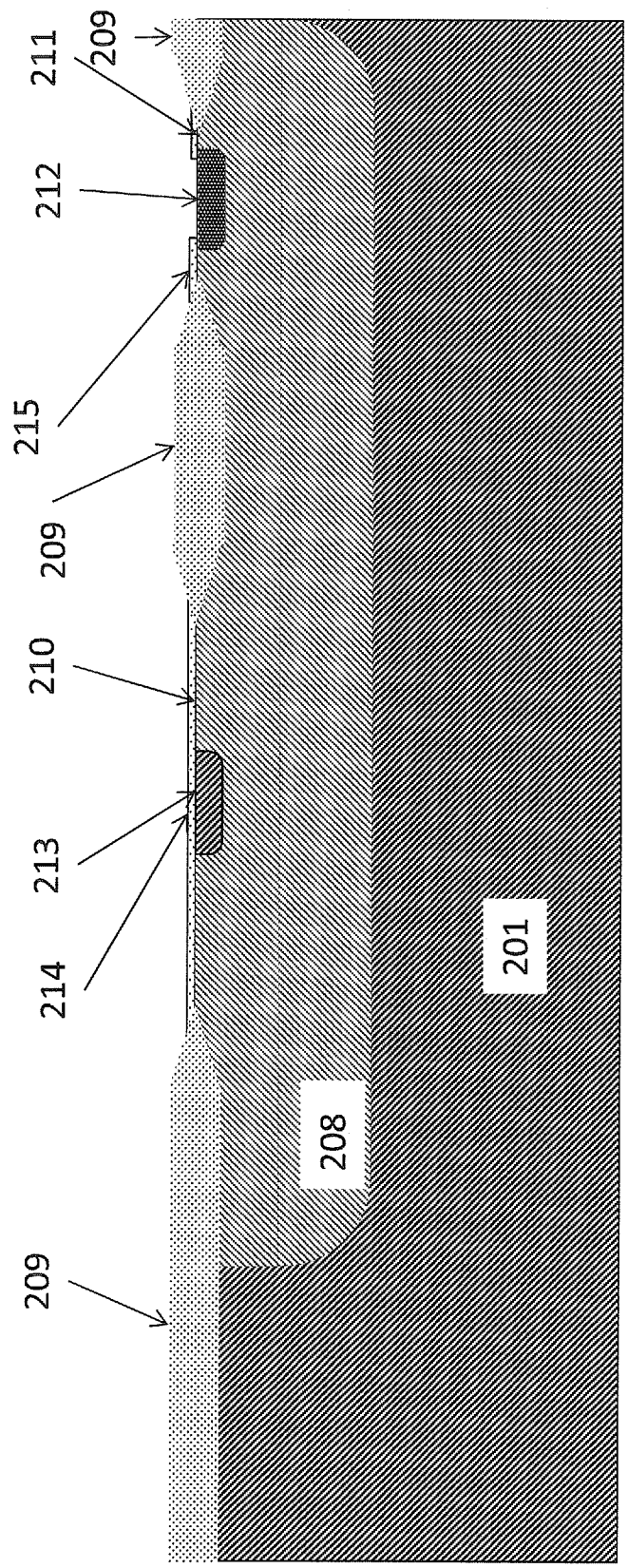

To allow for contacting, the contact windows in the oxides in the contact areas (215) will be etched with the aid of a photo technology (FIG. 24).

Figure 25:
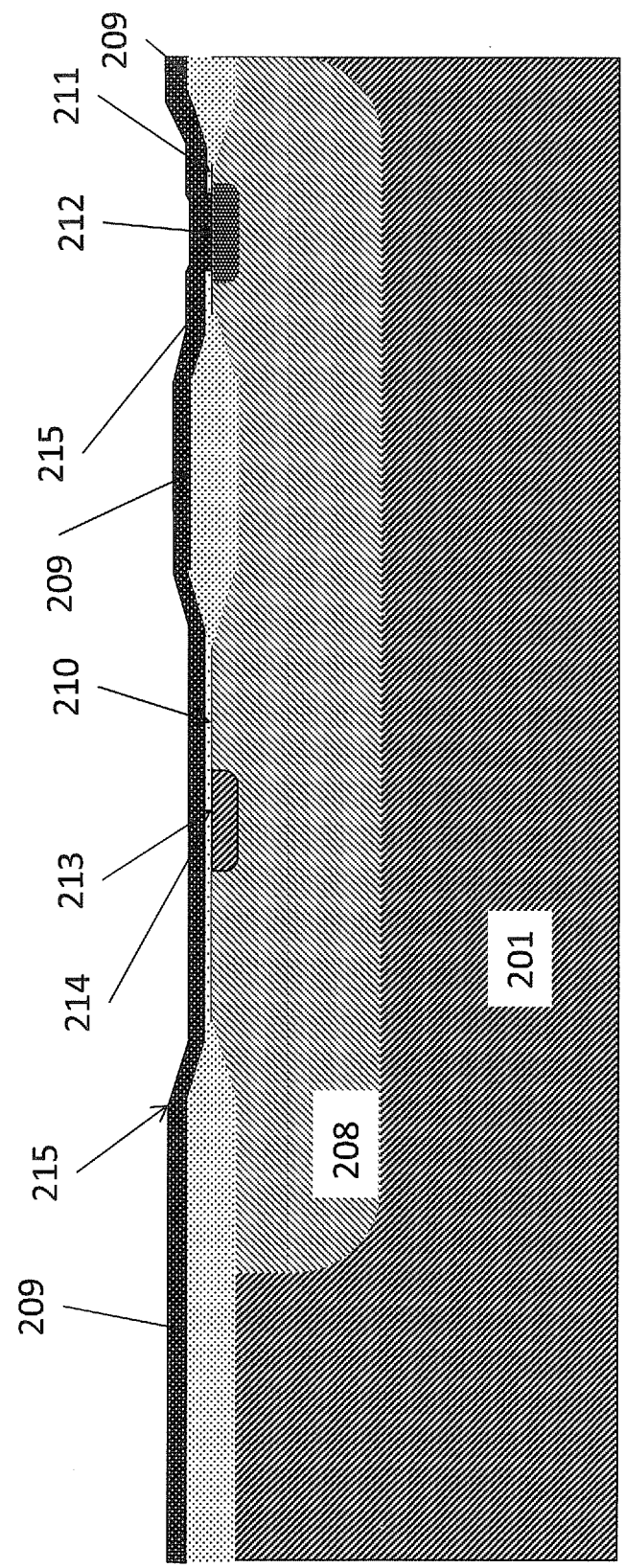

In the next step, the first absorber layer 216 will be deposited. Preferably, this is performed by deposition of a 350 nm Ti layer (FIG. 25).

Figure 26:
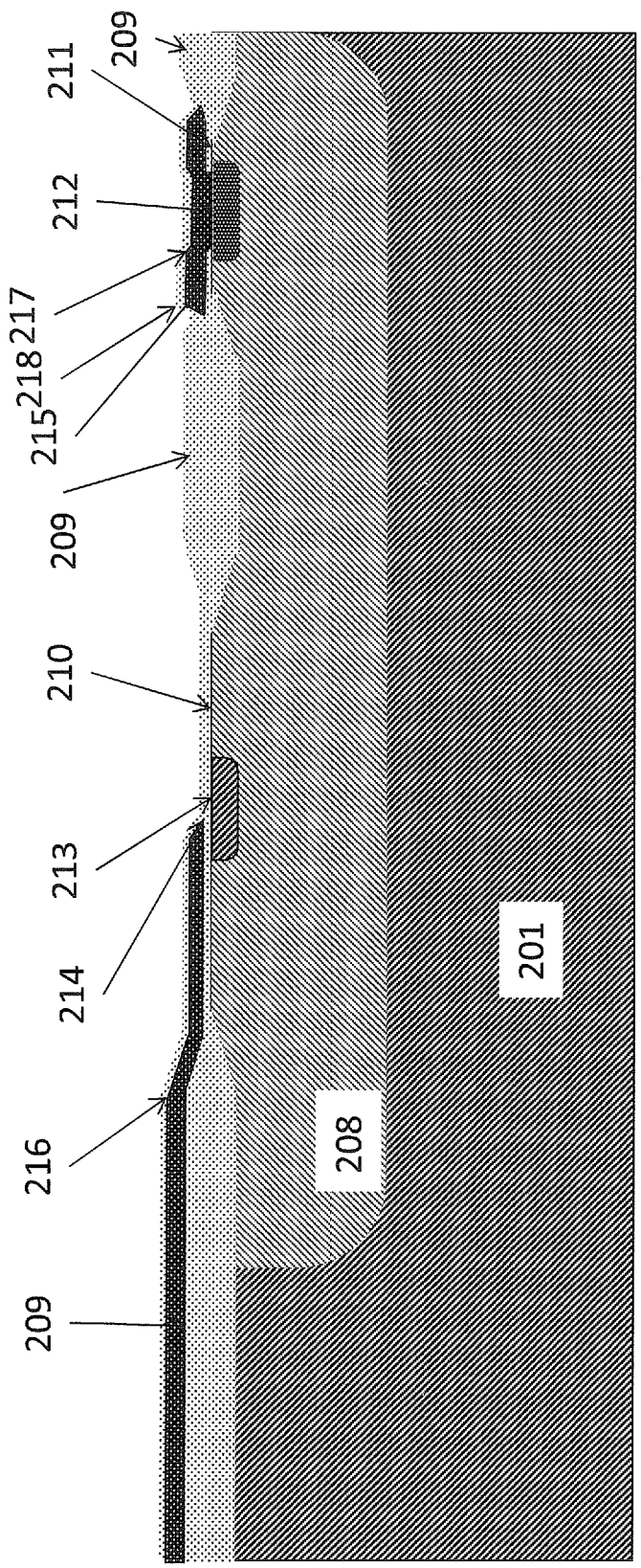

Next, this layer will be structured with the aid of a further photo technology followed by metal etching. There will be generated the first absorber 216 and the contact surfaces 217. For the sake of better survey, a contact surface to the p-region 213 is not shown. Onto this surface, there will be deposited a thin oxide layer 218 (FIG. 26). The oxide layer 218 again should have a thickness smaller than $\lambda/4$. This layer corresponds to the layer 102. Etching is preferably carried out in such a manner that the edges are preferably inclined by 45°. It has become evident that already inclinations smaller than 80° are helpful (see also 109 in FIGS. 12 to 14).

Figure 27:
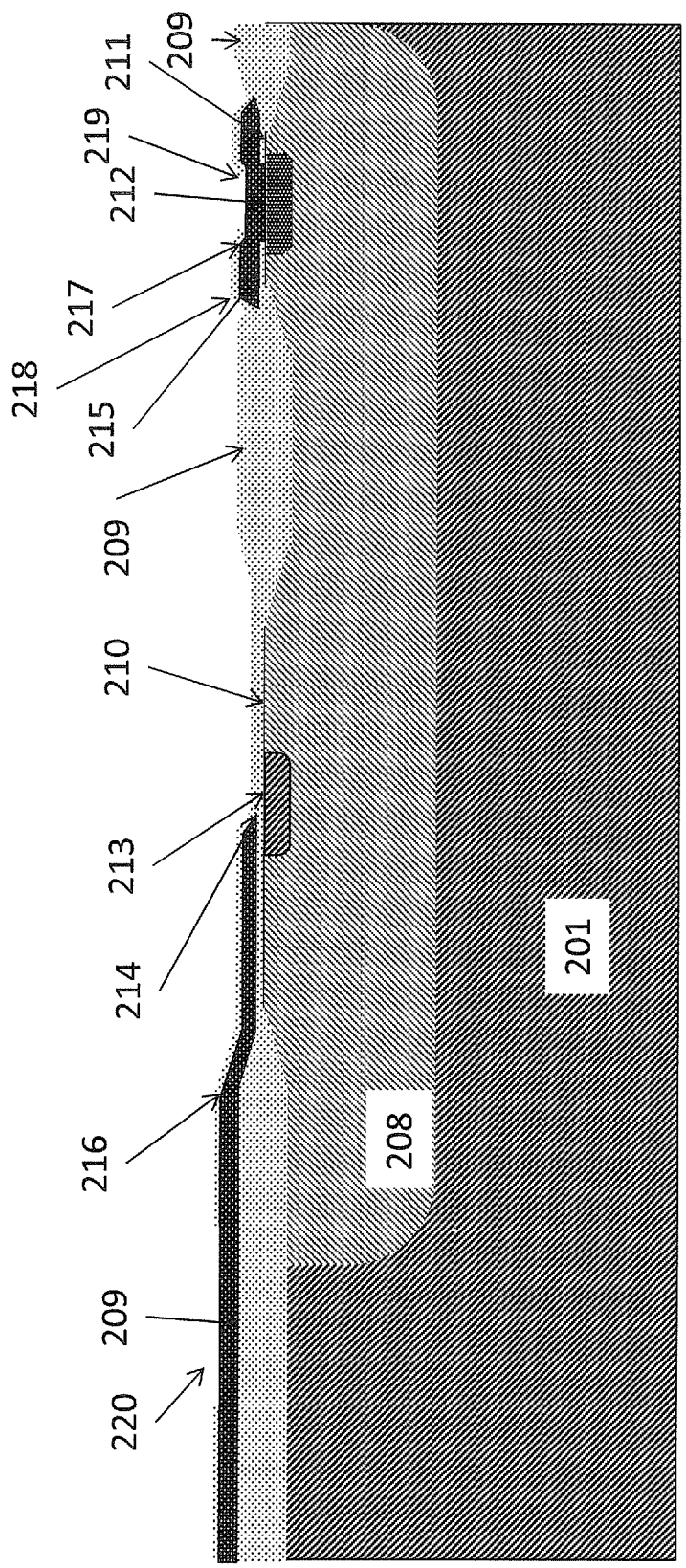

With the aid of a further photo technology followed by oxide etching, the later contact windows 220,219 will be opened in the oxide 218 (FIG. 27).

Figure 28:
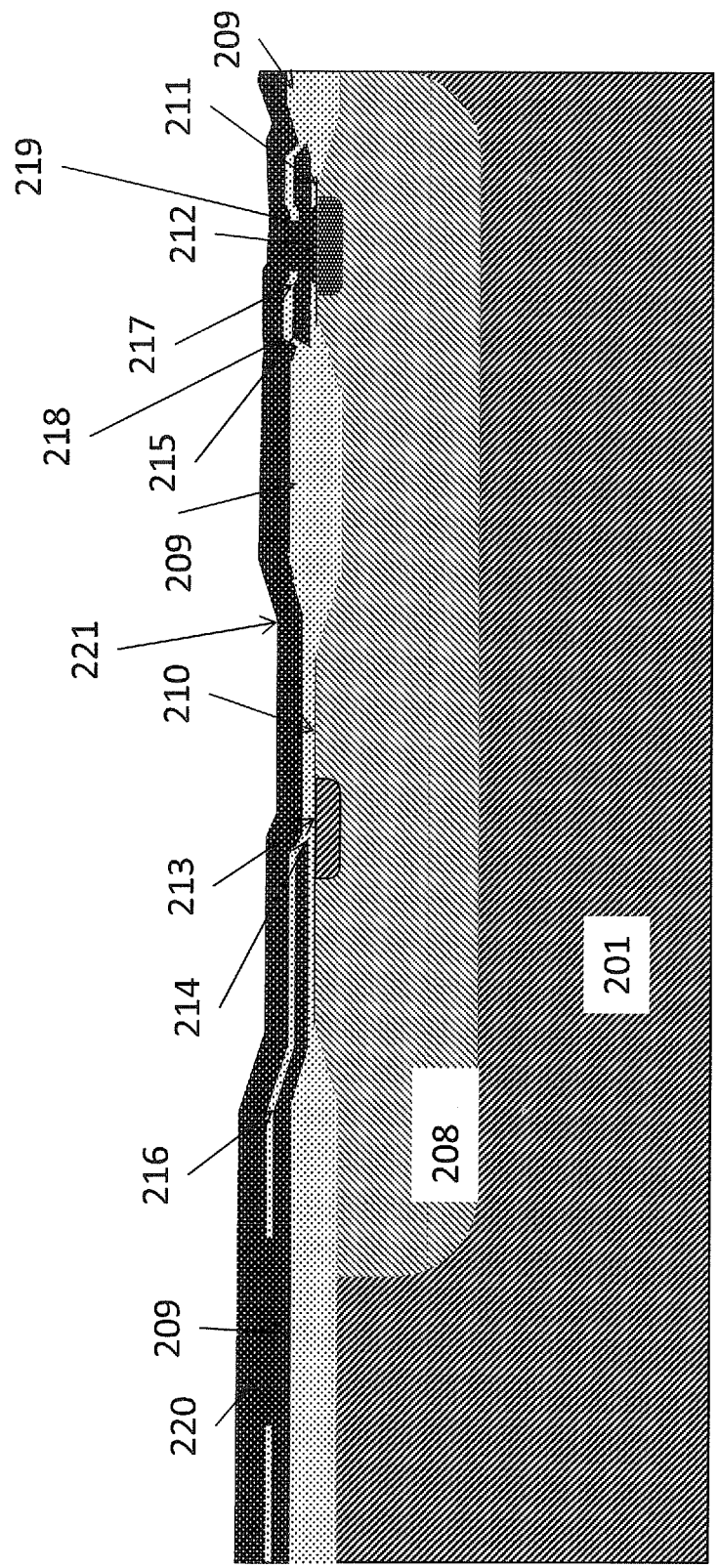

This is followed by the deposition of the second absorber layer 221. This is provided e.g. in the form of 350 nm titanium. The layer corresponds to the absorber layer 111 (FIG. 28).

Figure 29:
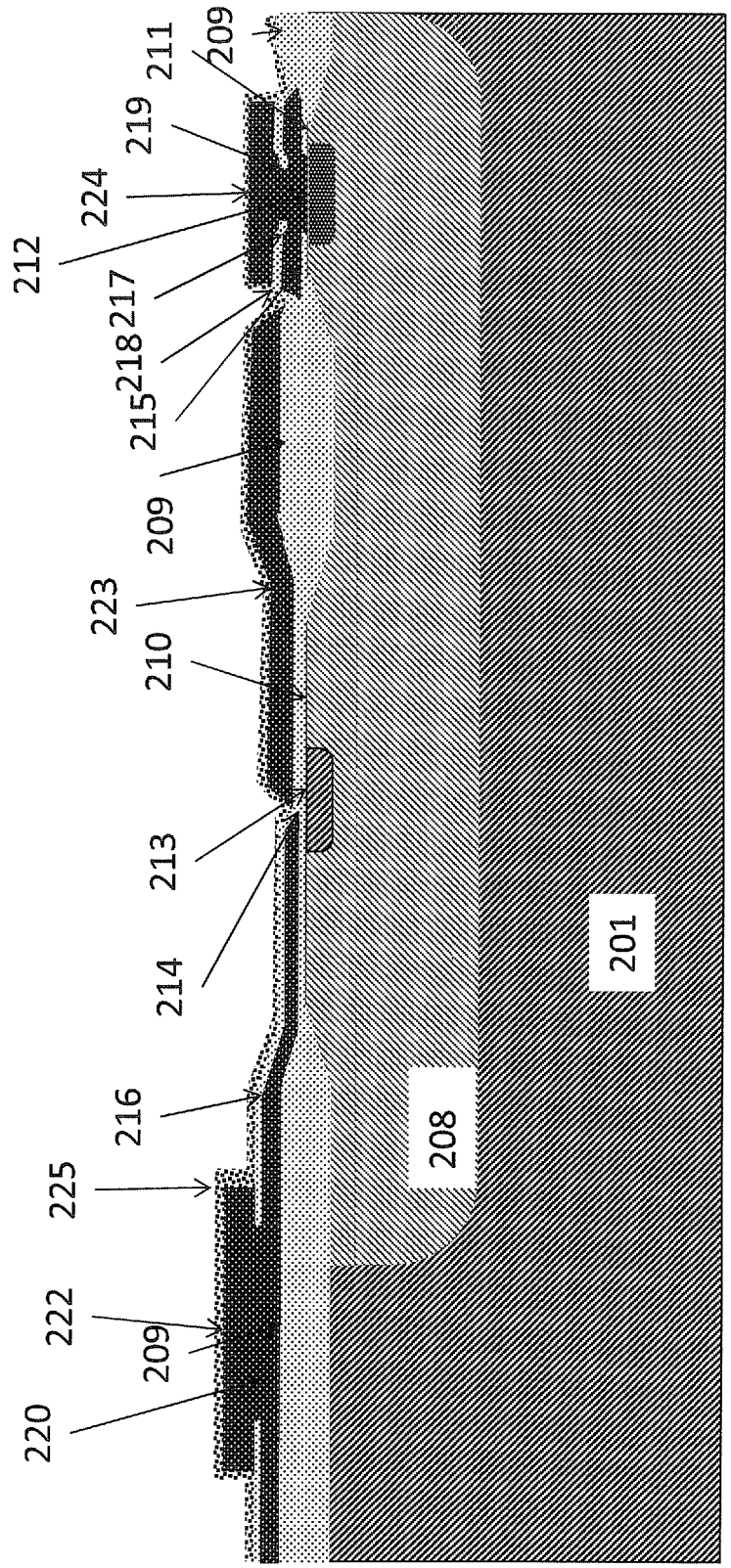

This layer will again be structured by a photo technology. There are generated, on the one hand, contacts to the first absorber 222, the second absorber 223 and contacts to the p-region 213 (not illustrated) and to the n-well 224. The whole arrangement will be covered by a $Si_3N_4$ layer 225 which is made as thin as possible. Optionally (not shown), in this regard, in the region of the photosensitive element, the Si3N4 layer can opened in the following photo-technology so as to reduce the resonances (FIG. 29).

Figure 30:
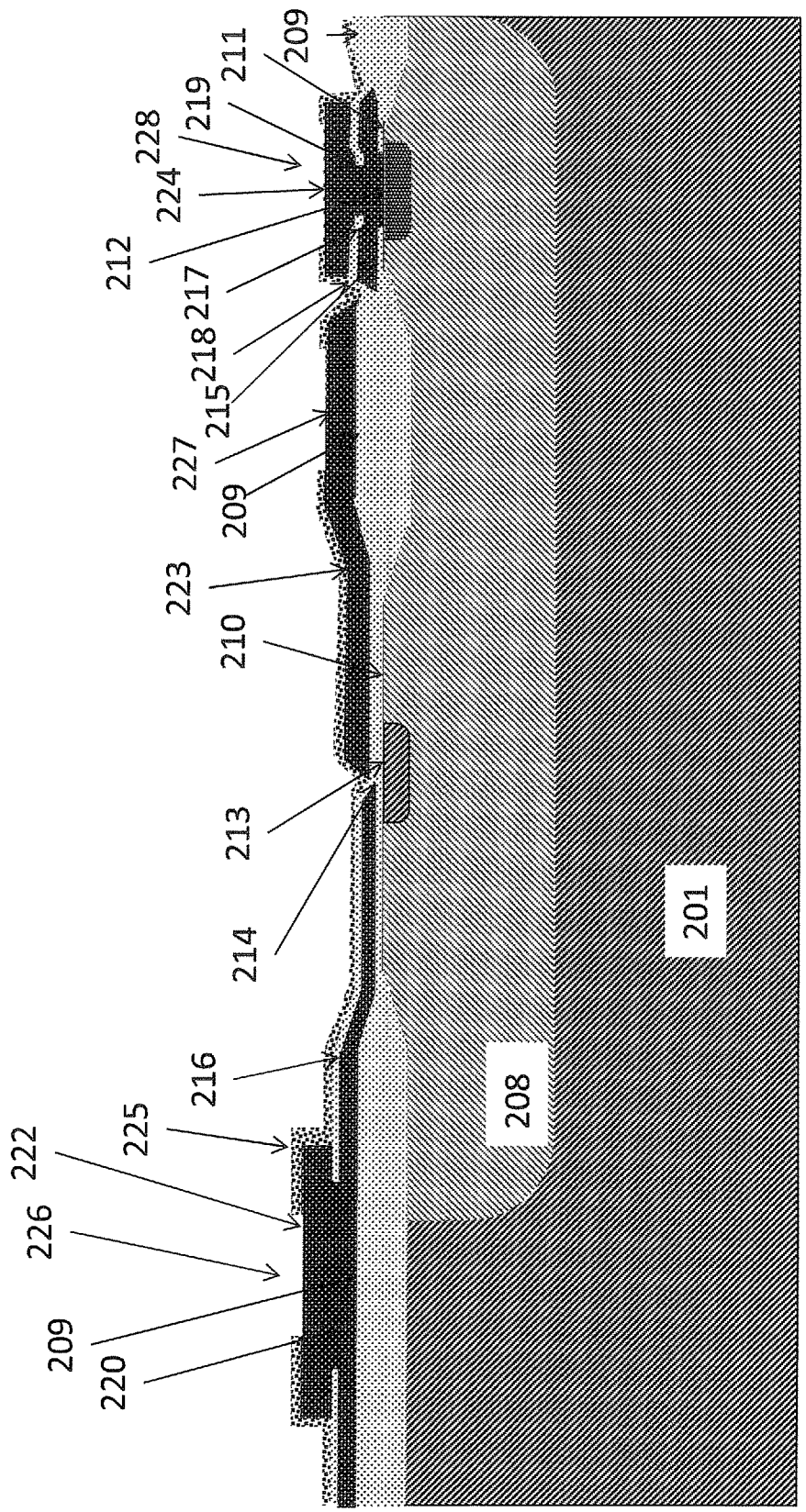

FIG. 30 illustrates the opening of the contact windows in the $Si_3N_4$ layer. There are generated openings 226 for connection of the first absorber, openings 227 for connection of the second absorber, openings for connection of the photosensitive p-regions (not shown) and openings 228 for connection of the n-wells.

Figure 31:
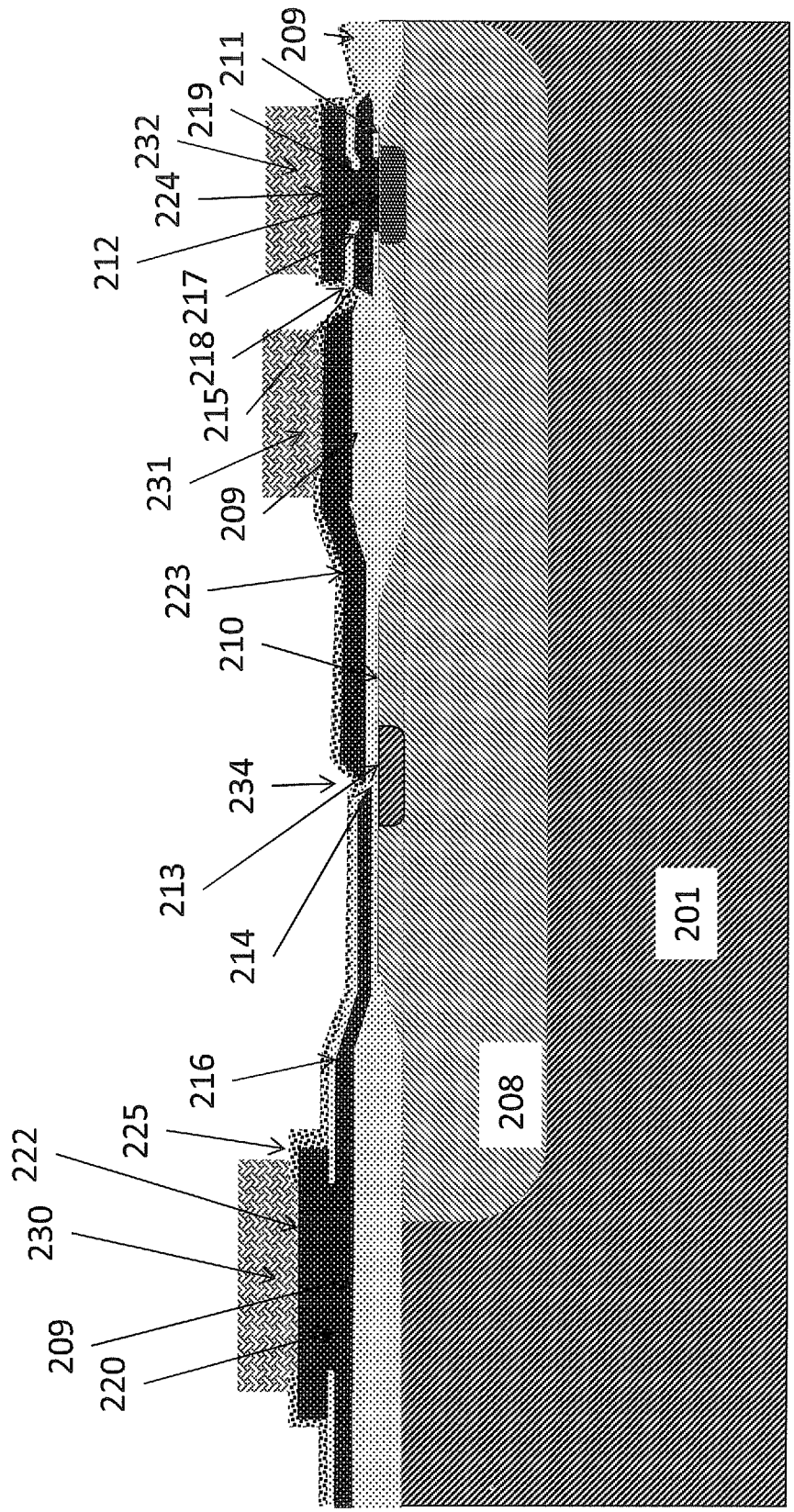

FIG. 31 shows the structure after application of a 1.2 μm aluminum layer, and the structuring of the latter by a photolithographic process. Thereby, bond islands are generated which allows for installation in a housing. Bond islands are generated for connection of the first absorber 230, for connection of the second absorber 231, for connection of the p-conducting regions of the photoconductive areas 213—not shown—and for connection of the n-wells 232.

To the expert, it is known that the metal, oxide and Si3N4 layers used herein, after having been provided with a photo lacquer layer and after the exposure and development thereof, can be structured e.g. by wet-chemical or plasma-based etching. Corresponding processes which are selective with respect to the materials that shall not be structure, are known from literature.

After examination and separation, e.g. by means of a saw or a laser, the components can be mounted in a housing. Herein, the housing should have an opening which either is not covered by an optical window, e.g. a glass, or includes a filter and/or diffuser suppressing the formation of further resonances and optionally effecting a homogenous distribution of light.

The invention has been described above in the context of its application in a spectrometer. Generally, however, the micro-optical filter of the invention can be used in considerably more applications, notably in all cases where it is desired that the passage of an electromagnetic way through an aperture mask should occur without disturbing resonances. Thus, in so far, the micro-optical filter must have resonance-damping properties. These can be achieved by the selection of the material of the micro-optical filter and/or also by the structure of its micro openings. In so far, it is important and suitable to design the aperture structure in the manner described in FIGS. 10 and 12 to 31.

LIST OF REFERENCE NUMERALS 10 spectrometer
10' spectrometer
10" spectrometer
10''' spectrometer
12 substrate
14 area
16 upper side
18 silicon oxide layer
20 aperture mask
22 window
24 window
26 material
30 photodiodes
32 aperture mask
34 area
36 window
38 edges
40 edges
42 radiation passage (opening)
44 gap width
48 polarisation filter
50 span axis
52 span axis
54 e-field vector
55 e-field vector
56 thermopile element
58 conductor
60 conductor
62 crossing point
64 membrane
66 cavities
68 cavities
70 wafer
72 membrane
74 housing
76 window
78 evaluation circuit
80 bus
82 CPU
84 memory
86 RAM
90 standard bus
92 filter
94 subtraction circuits
95 curve
96 curve
97 curve
101 passivation layer (Si3N4-layer)
102 intermediate dielectric layer
103 dielectric layer
104 aperture mask
105 thickness
107 thickness
108 thickness
109 edge
111 aperture mask
112 thickness
115 carrier
167 ledge
201 substrate
203 Si3N4 layer
204 hard mask
205 hard mask
206 contact areas
207 contact areas
209 field oxide
210 constructional element
211 contacts
213 constructional element
214 constructional element
215 contact window
216 absorber (layer)
218 contact surface
218 oxide layer
219 contact window
220 contact window
221 absorber layer
222 absorber
223 absorber
225 Si3N4 layer
226 openings
227 openings
228 openings
230 absorber
231 absorber

The invention claimed is:

1. Apparatus for selectively transmitting a spectrum of electromagnetic radiation between a lower limit wavelength and an upper limit wavelength, comprising:
a carrier,
a pinhole diaphragm arranged above the carrier and made of a material substantially impermeable to a radiation of interest, the pinhole diaphragm having at least one radiation passage opening with a width for allowing the passage of radiation of a wavelength less than or equal to the upper limit wavelength, the width of each of the at least one radiation passage opening being equal to a quarter or less than a quarter of the upper limit wavelength, an electrically insulating and optically transparent dielectric layer formed on the carrier inside the at least one radiation passage opening and extending, in a manner adjoining the radiation passage opening, between the carrier and at least one section below the pinhole diaphragm, the pinhole diaphragm comprising a first aperture mask and a second aperture mask, wherein:
- the first aperture mask is formed on the dielectric layer, wherein the first aperture mask is in a first plane above the carrier,
- the first aperture mask comprising first aperture mask windows having a first window spacing, each first aperture mask window comprising a first edge, wherein each first edge of the first aperture mask window is beveled in a first direction,
- the second aperture mask is formed on an intermediate dielectric layer, wherein the second aperture mask is in a second plane above the carrier different from the first plane, and the intermediate dielectric layer is made of an electrically insulating and optically permeable dielectric material,
- the second aperture mask comprising second aperture mask windows having a second window spacing different from the first window spacing of the first aperture mask, each second aperture mask window comprising a first edge, wherein the first edge of each second aperture mask window is beveled in a second direction, opposite the first direction,
- the first aperture mask windows and the second aperture mask windows overlap to form respective radiation passage openings of different sizes, wherein each radiation passage opening comprises the first edge of a first aperture mask window on the first plane and the first edge of a second aperture mask window on the second plane,
- wherein, between the second aperture mask and the carrier, the overall thickness of a double layer comprising the dielectric layer and the intermediate dielectric layer is less than or equal to a half to a quarter of the lower limit wavelength and
- wherein the first edge of the first aperture mask window and the first edge of the second aperture path window are configured to dampen resonance paths as a result of an obliquely directed propagation of the radiation after passage through the respective radiation passage opening and for at least minimizing a resonance between the aperture masks and the upper side of the carrier facing the aperture masks by scattering the radiation.

2. The apparatus according to claim 1, characterized in that the dielectric layer has a thickness less than or equal to a quarter of the lower limit wavelength.

3. The apparatus according to claim 1, characterized in that the dielectric layer extends between the carrier and the entire pinhole diaphragm.

4. The apparatus according to claim 1, characterized in that the pinhole diaphragm is formed on the carrier externally of the dielectric layer.

5. The apparatus according to claim 1, characterized in that the dielectric layer within the window or windows of the first aperture mask has a reduced thickness relative to a thickness of the dielectric layer in a remaining extension area of the dielectric layer.

6. The apparatus according to claim 5, wherein a type of material and material thickness of:
- the pinhole diaphragm,
- the first aperture masks, and
- the second aperture mask is selected to achieve:
- a degree of absorption larger than 60%, and
- a degree of reflection less than 40%, of the radiation of relevance not incident on a radiation passage opening.

7. The apparatus according to claim 1, characterized in that the pinhole diaphragm comprises a plurality of radiation passage openings having different widths and defining differently high upper limit wavelengths up to which the respective radiation passage opening allows the passage of electromagnetic radiation, wherein, for each different width, one or a plurality of radiation passage openings are provided, and that the thickness of the layer or layers between the carrier and the pinhole diaphragm or parts thereof, and respectively between the carrier and the two aperture masks or the second aperture mask, is each time less than or equal to a half to a quarter of the smallest one of the limit wavelengths defined by the radiation passage opening.

8. The apparatus according to claim 1, wherein
- each aperture mask window of the first aperture mask further comprises second edges orthogonal to the first edge of the respective aperture mask window of the first aperture mask,
- each aperture mask window of the second aperture mask further comprises second edges orthogonal to the first edge of the respective aperture mask window of the second aperture mask,
- the respective size of each respective radiation passage opening comprises the respective width of the respective radiation passage opening and a respective length of the respective radiation passage opening, wherein:
  - the respective width is defined by the first edge of the respective aperture mask window of the first aperture mask and the first edge of the respective aperture mask window of the second aperture mask,
  - the respective length is defined by the second edges of the respective aperture mask window of the first aperture mask and the second edges of the respective aperture mask window of the second aperture mask.

* * * * *